United States Patent [19]

Ikenoue et al.

[11] 4,213,784

[45] Jul. 22, 1980

[54] PROCESS FOR PRODUCING HEAT DEVELOPABLE LIGHT-SENSITIVE COMPOSITIONS AND ELEMENTS

[75] Inventors: Shinpei Ikenoue; Takao Masuda, both of Asaka, Japan

[73] Assignee: Fuji Photo Film Co., Ltd., Ashigara, Japan

[21] Appl. No.: 921,541

[22] Filed: Jul. 3, 1978

Related U.S. Application Data

[63] Continuation of Ser. No. 625,622, Oct. 24, 1975, abandoned.

[30] Foreign Application Priority Data

| | | | |
|---|---|---|---|
| Apr. 15, 1971 | [JP] | Japan | 46-45656 |
| Oct. 24, 1974 | [JP] | Japan | 49-122902 |
| Dec. 13, 1974 | [JP] | Japan | 49-143178 |
| Jan. 31, 1975 | [JP] | Japan | 50-23074 |
| Jul. 1, 1975 | [JP] | Japan | 50-81181 |

[51] Int. Cl.[2] .... G03C 1/02; C07F 1/10; C11C 1/100

[52] U.S. Cl. .................................... 430/616; 430/353; 260/414; 260/430; 430/619

[58] Field of Search ...................... 96/114.1, 107, 108, 96/114.6; 260/414, 430

[56] References Cited

U.S. PATENT DOCUMENTS

| | | | |
|---|---|---|---|
| 3,839,041 | 10/1974 | Hiller | 96/114.1 |
| 3,877,940 | 4/1975 | Ericson | 96/114.1 |
| 3,893,859 | 7/1975 | Burness | 96/114.1 |

*Primary Examiner*—Mary F. Kelley

*Attorney, Agent, or Firm*—Sughrue, Rothwell, Mion, Zinn and Macpeak

[57] ABSTRACT

In a process for producing thermally developable light-sensitive composition which comprises heating a composition containing (a) an organic silver salt and (b) a light-sensitive silver halide, the improvement wherein the heating is conducted in the presence of (c) a sulfur-containing compound.

66 Claims, No Drawings

PROCESS FOR PRODUCING HEAT DEVELOPABLE LIGHT-SENSITIVE COMPOSITIONS AND ELEMENTS

This is a continuation of application Ser. No. 625,622 filed Oct. 24, 1975, now abandoned.

BACKGROUND OF THE INVENTION

1. Field of the Invention

The present invention relates to a process for producing a heat developable light-sensitive composition more particularly to a process of producing a heat developable light-sensitive composition having improved light-sensitivity.

2. Description of the Prior Art

At present, the most successful light-sensitive element capable of forming a photographic image by dry processing is a heat developable light-sensitive element employing a composition comprising a silver salt of an organic acid, a small amount of a light-sensitive silver halide and a reducing agent, e.g., as described in U.S. Pat. Nos. 3,152,904 and 3,457,075. In such a light-sensitive system, the silver halide, which remains in the element after development, is not stabilized against light and allowed to be discolored by light. Nevertheless, the element provides results as if it were stabilized, because the silver halide is only used in a slight amount and most of the silver source is a white or light-colored organic silver salt which is stable and hardly blackened by light. Thus, even if a small amount of silver halide is discolored by light, the slight discoloring does not give rise to any visual difficulties since the element, on the whole, appears white or only slightly colored. The light-sensitive element is stable at normal temperature, but when it is image-wise exposed and heated usually to above about 80° C., preferably above 100° C., the organic silver salt oxidizing agent and the reducing agent which are present in the light-sensitive element undergo oxidation-reduction reactions due to the catalytic action of the exposed silver halide present in the vicinity thereof to form silver. By this reaction, the exposed areas of the light-sensitive layer are rapidly blackened so that contrast is formed between the exposed areas and the unexposed areas (background), i.e., an image is formed.

As processes for preparing a light-sensitive silver halide which acts as the light-sensitizing catalyst in a light-sensitive layer of this type of thermally developable light-sensitive material, processes for preparing gelatino-silver halide emulsions as are generally known in the photographic arts have been used. However, when silver halide is previously prepared and mixed with an organic silver salt as described in U.S. Pat. No. 3,152,904, the problem results that sufficient light sensitivity cannot be obtained since the organic silver salt and silver halide are not easily brought into catalytic contact with each other. On the other hand, when a halogenating agent acts on an organic silver salt to form silver halide in part of the organic silver salt as is described in U.S. Pat. No. 3,457,075, remarkably high light sensitivity can be obtained since both are in catalytic contact with each other. As a result of extensive efforts to improve this process, the invention previously discovered that when an N-halogeno compound is used as a halogenating agent, there can be obtained a thermally developable light-sensitive material having high sensitivity and undergoing lowered heat fog. In this improved process, however, there has been a limit on the light sensitivity, and it has therefore been desired to further improve light sensitivity.

SUMMARY OF THE INVENTION

Accordingly, it is an object of this invention to provide a novel process of producing a heat developable light-sensitive composition and element having improved light-sensitivity.

We have surprisingly found that these and other objects of this invention can be attained by using a composition which is prepared by heating a composition containing (a) an organic silver salt and (b) a light-sensitive silver halide in the presence of (c) a sulfur-containing compound.

DETAILED DESCRIPTION OF THE INVENTION

The organic silver salts employed as component (a) in the invention are colorless, white or slightly colored silver salts which are comparatively stable to light and which react with the reducing agent to form silver images when heated to a temperature at about 80° C. or higher, preferably 100° C. or higher, in the presence of exposed silver halide. Examples of organic silver salts include silver salts or organic compounds containing an imino group, a mercapto group, a thione group or a carboxyl group. Typical examples of these organic silver salts include:

(1) Silver salts of organic compounds containing an imino group:

Silver benzotriazole, silver nitrobenzotriazole, silver alkyl-substituted benzotriazoles (e.g., silver methylbenzotriazole), silver halogen-substituted benzotriazoles (e.g., silver bromobenzotriazole or silver chlorobenzotriazole), silver carboimide-substituted benzotriazoles (e.g.,

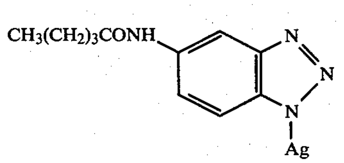

or

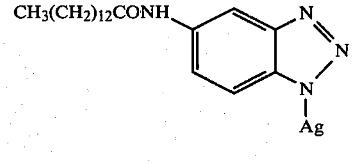

), silver benzoimidazole, silver substituted-benzimidazoles (e.g., silver 5-chlorobenzimidazole or silver 5-nitrobenzimidazole), silver carbazole, silver saccharin, silver phthalazinone, silver substituted-phthalazinone, silver salts of phthalimides, silver pyrrolidone, silver tetrazole and silver imidazole;

(2) Silver salts of organic compounds containing a mercapto group of a thione group:

Silver 3-mercapto-4-phenyl-1,2,4-triazole, silver 2-mercaptobenzimidazole, silver 2-mercapto-5-aminothiadiazole, silver 1-phenyl-5-mercaptotetrazole, silver 2-mercaptobenzothiazole, silver salts of the thioglycolic acids as described in Japanese Patent Application (OPI) 28221/73 (e.g., silver 2-(S-ethylenethioglycolamido)-benzthiazole or silver S-alkyl($C_{12}$–$C_{22}$)thioglycolates), silver salts of dithiocarboxylic acids (e.g., silver dithioacetate), silver thioamide, silver salts of thiopyridines (e.g., silver 5-carbethoxy-1-methyl-2-phenyl-4-thiopyridine), silver dithiohydroxybenzole, silver mercaptotriazine, silver 2-mercaptobenzoxazole and silver mercaptooxadiazole, etc.;

(3) Silver salts of organic compounds containing a carboxylic group:

(a) Silver salts of aliphatic carboxylic acids:

Silver caprate, silver laurate, silver myristate, silver palmitate, silver stearate, silver behenate, silver maleate, silver fumarate, silver tartarate, silver furoate, silver linolate, silver oleate, silver hydroxystearate, silver adipate, silver sebacate, silver succinate, silver acetate, silver butyrate and silver camphorate;

(b) Silver salts of aromatic carboxylic acids: Silver benzoate, silver 3,5-dihydroxybenzoate, silver o-methylbenzoate, silver m-methylbenzoate, silver p-methylbenzoate, silver 2,4-dichlorobenzoate, silver acetamidobenzoate, silver p-phenylbenzoate, silver salts of other substituted benzoic acids, silver gallate, silver tannate, silver phthalate, silver terephthalate, silver salicylate, silver phenylacetate, silver pyromellitate, silver 4′-n-octadecyloxydiphenyl-4-carboxylate, silver thionecarboxylates as disclosed in U.S. Pat. No. 3,785,830 and silver salts of aliphatic carboxylic acids containing a thioether group as disclosed in U.S. Pat. No. 3,330,663;

(4) Other silver salts:

Silver 4-hydroxy-6-methyl-1,3,3a,7-tetraazaindene, silver 5-methyl-7-hydroxy-1,2,3,4,6-pentaazindene, silver tetraazindene as disclosed in British Patent No. 1,230,642, silver S-2-aminophenylthiosulfate as disclosed in U.S. Pat. No. 3,549,379, metal-containing aminoalcohols as disclosed in Japanese Patent Application (OPI) No. 6586/71, and organic acid-metal chelates as disclosed in Belgian Patent No. 768,411.

An oxidizing agent such as titanium dioxide, zinc oxide or a gold carboxylate (e.g., aurous laurate, aurous stearate or aurous behenate) in addition to the organic silver salt can be employed together with the organic silver salt, if desired.

Various proceses are known for preparing such organic silver salts. One of the simplest processes for preparing them is described in U.S. Pat. No. 3,457,075, wherein a solution of an organic silver salt forming agent or a salt thereof in a water-miscible solvent, such as an alcohol or acetone, or water is mixed with an aqueous solution of a water-soluble silver salt such as silver nitrate to prepare an organic silver salt.

Further, it is possible to use the process described in U.S. Pat. No. 3,839,049, wherein a colloidal dispersion of an ammonium salt or an alkali metal salt of an organic silver salt forming agent is mixed with an aqueous solution of a water-soluble silver salt such as silver nitrate. In a similar process, it is possible to use an aqueous solution of a silver complex salt such as a silver amine complex salt or a solution of such a salt in a water-miscible solvent instead of the aqueous solution of the water-soluble silver salt such as silver nitrate.

Another process for preparing organic silver salts is the process described in U.S. Pat. No. 3,458,544. Namely, in this process, organic carboxylic acid silver salts are prepared by mixing a solution substantially immiscible with water (oily solution) such as a benzene solution of an organic carboxylic acid with an aqueous solution of a silver complex salt. Preferably, the water is added to the oily solution to form an emulsion prior to mixing with the aqueous solution of the silver complex salt. This process can be also applied to the preparation of other organic silver salts.

A similar process is described in Canadian Patent No. 847,351, wherein the resulting organic silver salts are more stable to heat and light. In this process, a silver salt solution free of alkali, such as an aqueous solution containing only silver nitrate, is used instead of the silver complex salt.

Further, a process for preparing organic silver salts is described in West German Patent Application (OLS) No. 2,402,906. This process is preferred because heat-developable light-sensitive materials containing the resulting organic silver salt do not form as much heat-fog (undesirable fog generated in unexposed areas when the light-sensitive material is heated). Namely, this process comprises mixing an emulsion composed of an aqueous solution of a salt (for example, an alkali metal salt such as a sodium salt, a potassium salt or a lithium salt or an ammonium salt, etc.) of a water-soluble organic silver salt forming agent and an oil (for example, benzene, toluene, cyclohexane, pentane, hexane, carboxylic acid esters such as an acetate, phosphoric acid esters, and oils such as castor oil, etc.) with a solution of, preferably an aqueous solution of, a silver salt which is more water-soluble than the organic silver salt (such as silver nitrate) or a silver complex salt to prepare the organic silver salt. In another embodiment of this process, it is possible to prepare the organic silver salt by mixing an aqueous alkali solution (for example, an aqueous solution of sodium hydroxide) with an oil-soluble solution of an organic silver salt forming agent (for example, a toluene solution of the organic silver salt forming agent) and mixing the resulting emulsion with a solution, and preferably an aqueous solution, of a soluble silver salt such as silver nitrate or a silver complex salt such as a silver ammine complex salt.

The oils which can be used for the above-described oily solution include the following compounds:

(1) Phosphoric acid esters:

For example, tricresyl phosphate, tributyl phosphate, and monooctyl dibutyl phosphate, etc.

(2) Phthalic acid esters:

For example, diethyl phthalate, dibutyl phthalate, dimethyl phthalate, dioctyl phthalate and dimethoxyethyl phthalate, etc.;

(3) Carboxylic acid esters:

For example, acetates such as amyl acetate, isopropyl acetate, isoamyl acetate, ethyl acetate, 2-ethylbutyl acetate, butyl acetate and propyl acetate, etc.; sebacates such as dioctyl sebacate, dibutyl sebacate, and diethyl sebacate, etc.; succinates such as diethyl succinate; formates such as ethyl formate, propyl formate, butyl formate and amyl formate, etc.; tartarates such as diethyl tartarate; valerates such as ethyl valerate; butyrates such as methyl butyrate, ethyl butyrate, butyl butyrate and isoamyl butyrate; and adipic acid esters, etc.;

(4) Oils such as castor oil, cotton seed oil, linseed oil and tsubaki oil, etc.;

(5) Aromatic hydrocarbons such as benzene, toluene and xylene, etc.;

(6) Aliphatic hydrocarbons such as pentane, hexane and heptane, etc.; and (7) Cyclic hydrocarbons such as cyclohexane.

Examples of silver complex salts include silver ammine complex salt, silver methylamine complex salt and silver ethylamine complex salt, and preferably alkali-soluble complex salts having a dissociation constant higher than the organic silver salts.

Examples of solvents for the silver salts such as silver nitrate include not only water but also polar solvents such as dimethyl sulfoxide, dimethylformamide and acetonitrile, etc.

Further, ultrasonic waves can be employed during the preparation of the organic silver salts as described in West German Patent Application (OLS) No. 2,401,159. Particularly, emulsification can be easily carried out by applying ultrasonic waves when it is desired to emulsify water and oils. Further, it is possible to use surface active agents for the purpose of controlling the particle size of the organic silver salts during the preparation thereof.

The organic silver salts can also be prepared in the presence of polymers. A specific process has been described in U.S. Pat. No. 3,700,458, which comprises mixing a non-aqueous solution of an organic carboxylic acid with a non-aqueous solution of a heavy metal salt of trifluoroacetate or tetrafluoroborate in the presence of a polymer to produce a heavy metal salt of the organic carboxylic acid, such as a silver salt thereof. A process which comprises reacting a colloid dispersion of an organic silver salt forming agent with an aqueous solution of silver nitrate has been described in U.S. Pat. No. 3,839,049. Furthermore, a process for producing an emulsion using similar non-aqueous solutions has been described in U.S. Pat. No. 3,748,143. In addition, it is possible, as described in Japanese Patent Application (OPI) No. 13224/1974 and West German Patent Application (OLS) No. 2,322,096, to change the particle form, the particle size and photographic properties such as light stability or sensitivity of the organic silver salts due to the presence of a metal salt or a metal complex such as a mercury or lead compound during the preparation of the organic silver salts.

It has been also confirmed that cobalt, manganese, nickel, iron, rhodium, iridium, platinum, gold, cadmium, zinc, lithium, copper, thallium, tin, bismuth, antimony, chromium, ruthenium, palladium and osmium, in addition to the mercury and lead described above, are effective as the metal. In order to use these metal containing compounds, a mixture or dispersion of a solution of a silver salt forming organic compound and a metal containing compound can be mixed with an aqueous solution of a soluble silver salt such as silver nitrate or an aqueous solution of a silver complex salt such as a silver ammine complex salt. Further, a solution or dispersion of the metal containing compound can be mixed with an aqueous solution of the silver salt or a silver complex salt and a solution or dispersion of the silver salt forming organic compound. Furthermore, a method comprising mixing a solution or dispersion of the silver salt forming organic compound with a solution or dispersion of a mixture of the silver salt or silver complex salt and the metal containing compound is also preferred. A preferred amount of the metal containing compound ranges from about $10^{-6}$ to $10^{-1}$ mols per mol of the organic silver salt and from about $10^{-5}$ to $10^{-2}$ mols per mol of the silver halide.

The particle size of thus-resulting organic silver salts is about 0.01 micron to about 10 microns as longest diameter, preferably about 0.1 micron to about 5 microns.

Examples of light-sensitive silver halides which can be employed as component (b) in the invention include silver chloride, silver bromide, silver iodide, silver chlorobromoiodide, silver chlorobromide, silver chloroiodide, silver iodobromide and a mixture thereof. The light-sensitive silver halide can be coarse particles or fine particles, but preferably is fine particles. A preferred particle size of the silver halide is about 0.001 to 1 micron, more preferably about 0.01 to 0.5 micron, longest diameter.

The light-sensitive silver halide can be prepared by any of the procedures known in the field of photography, such as a single jet procedure or a double jet procedure. Examples of silver halides used in this invention include these prepared by a Lippmann process, an ammoniacal process and the thiocyanate or thioether ripening process. The silver halide can be unwashed or washed, e.g., with water, alcohols, etc. to remove soluble salts.

The silver halide used in the invention can be chemically sensitized with a chemical sensitizer such as sulfur, selenium, tellurium, gold, platinum, palladium, a stannous halide, etc., e.g., as disclosed in U.S. Pat. Nos. 1,623,499, 2,399,083 and 3,297,447. The silver halide preferably contains an antifoggant or a stabilizer such as a thiazolium salt, an azaindene, a mercury salt, a urazole, a sulfocatechol, an oxime, a nitron, a nitroindazole, etc., to stabilize the silver halide to fog, e.g., as disclosed in U.S. Pat. Nos. 2,728,663, 2,839,405, 2,566,263, 2,597,915 and British Patent No. 623,448.

A pre-prepared silver halide emulsion can be mixed with an oxidation-reduction composition comprising an organic silver salt and a reducing agent, as described in U.S. Pat. No. 3,152,904. According to this method, however, sufficient contact is not attained between the silver halide and the organic silver salt (e.g., as disclosed in U.S. Pat. No. 3,457,075). In order to achieve good contact between the silver halide and the organic silver salt, various techniques can be employed. One effective technique is to mix the materials in the presence of a surface active agent, as described in German (OLS) No. 2,435,391, and in Japanese Patent Application No. 82851/73. According to another method, a silver halide is prepared in the presence of a polymer and then mixed with an organic silver salt (for example, as disclosed in U.S. Pat. Nos. 3,705,565, 3,713,833, 3,706,564 and 3,761,273; French Pat. Nos. 2,107,162 and 2,078,586; and Belgian Pat. No. 774,436.

The light-sensitive halide employed in the invention can be prepared simultaneously with the organic silver salt, as disclosed in German (OLS) No. 2,428,125, if desired. That is, the silver halide can be prepared by mixing a silver salt (e.g., silver nitrate or a silver complex salt) solution with a solution or dispersion of an organic silver salt-forming compound or a salt thereof and a silver halide forming compound solution, or by mixing a silver halide-forming compond solution and a solution or dispersion of an organic silver salt-forming compound or a salt thereof and a solution of a silver salt such as silver nitrate or a silver complex salt, whereby silver halide is prepared simultaneously with the organic silver salt. Further, the light-sensitive silver halide employed in the invention can be prepared by a partial conversion of the organic silver salt by subjecting a solution or dispersion of the previously prepared organic silver salt to a silver halide forming compound or a sheet material containing an organic silver salt with a silver halide forming compound. The thus-prepared silver halide is effectively contacted with the organic silver salt to provide preferred results as disclosed in U.S. Pat. No. 3,457,075.

The light-sensitive silver halide forming components which can be employed in this invention include any compounds capable of forming silver halide on reaction with the organic silver salt. Whether the compounds can be employed as a silver halide forming component can be determined by a routine test. For example, after mixing a compound for forming silver halide with the organic silver salt, and if necessary heating, for example, when promotion of an AgBr forming reaction is desired, the X-ray diffraction pattern is examined to determine whether diffraction peaks inherent to silver halide are present. If so, obviously the system is acceptable.

Examples of silver halide forming components include the following compounds.

(1) Inorganic halides:

For example, halides represented by the formula $MX'_n$, wherein M represents H, $NH_4$ or a metal atom, X' represents Cl, Br or I, and n is 1 if M represents H or $NH_4$, or n represents the valence of the metal atom if M represents a metal atom. Examples of suitable metal atoms include lithium, sodium, potassium, rubidium, cesium, copper, gold, beryllium, magnesium, calcium, strontium, barium, zinc, cadmium, mercury, aluminium, gallium, indium, thallium, germanium, tin, lead, antimony, bismuth, chromium, molybdenum, tungsten, manganese, rhenium, iron, cobalt, nickel, ruthenium, rhodium, palladium, osmium, iridium and platinum. Particularly preferred examples of M are alkali metals, alkaline earth metals and an atomic number of 21 to 30.

(2) Halogen containing metal complexes:

For example, $K_2PtCl_6$, $K_2PtBr_6$, $HAuCl_4$, $(NH_4)_2IrCl_6$, $(NH_4)_3IrCl_6$, $(NH_4)_2RuCl_6$, $(NH_4)_3RuCl_6$, $(NH_4)_3RhCl_6$ and $(NH_4)_3RhBr_6$, etc.

(3) Onium halides:

For example, quaternary ammonium halides such as trimethylphenyl ammonium bromide, cetylethyldimethyl ammonium bromide and trimethylbenzyl ammonium bromide, quaternary phosphonium halides such as tetraethyl phosphonium bromide and tertiary sulfonium halides such as trimethyl sulfonium iodide. Further, these onium halides can be used in final coating dispersions for the purpose of decreasing sensitivity or, if desired, decreasing background density, as described in U.S. Pat. No. 3,679,422.

(4) Halogenated hydrocarbons:

For example, iodoform, bromoform, carbon tetrabromide and 2-bromo-2-methylpropane, etc.

(5) N-halogen compounds:

Typical N-halo compounds suitable for the invention are the compounds represented by the following general formulas:

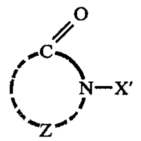
(A)

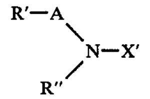
(B)

In these general formulas, X' is a halogen atom preferably a chlorine, bromine or iodine atom. Z represents an atomic group necessary for forming a 5-membered ring or 6-membered ring which can be condensed with another ring. Examples of suitable 5-membered rings and 6-membered rings are pyrrole, pyrroline, pyrrolidine, imidazole, imidazoline, imidazolidine, pyrazole, pyrazoline, pyrazolidine, triazole, tetrazole, piperidine, oxazine, thiazine, piperazine (these previously described rings can contain an oxo group or a thiooxo group, and also can include rings where aromatic rings are combined with the above ring through a phenylene group, etc.), hydantoin, cyanuric, thiohydantoin, hexahydrotriazine, indole, indoline, isoindole, benzoimidazole, cabazole and phenoxazine rings. A particularly preferred ring is a pyrrolidine ring. These rings can also be substituted with alkyl groups, aryl groups, alkoxy groups, halogen atoms, oxygen atoms and sulfur atoms. Suitable alkyl groups are those having 1 to about 12 carbon atoms, preferably 1 to 8 carbon atoms, for example, methyl, ethyl, propyl, isopropyl, butyl, isobutyl, t-butyl, pentyl, hexyl, 2-ethylhexyl, octyl, nonyl, decyl and dodecyl groups. Suitable aryl groups are preferably a phenyl group and a naphthyl group, which can be substituted with one or more or alkyl groups having 1 to 4 carbon atoms, such as methyl, ethyl, propyl, isopropyl, butyl and t-butyl groups, and halogen atoms such as chlorine, bromine and iodine. Suitable alkoxy groups are preferably those having 1 to about 12 carbon atoms, more particularly 1 to 8 carbon atoms, such as methoxy, ethoxy, propoxy, isopropoxy, butoxy, t-butoxy, pentoxy, hexoxy, octoxy and dodecoxy groups. A represents a carbonyl group or a sulfonyl group. R' and R'' each represents an alkyl group, an aryl group or an alkoxy group, the alkyl group and the alkoxy group being preferably those having 1 to about 12 carbon atoms, more preferably 1 to 8 carbon atoms, and the aryl group being preferably a naphthyl group or a phenyl group, which can be substituted with one or more of the above described groups. R'' can also represent a hydrogen atom. The halogenated malamines are N-halo compounds also suitable for the present invention.

Typical examples of N-halo compounds suitable for the invention are as follows.

(1) N-Bromosuccinimide
(2) N-Bromotetrafluorosuccinimide
(3) N-Bromophthalimide
(4) N-Bromoglutarimide
(5) 1-Bromo-3,5,5'-trimethyl-2,4-imidazolidinedione
(6) 1,3-Dibromo-5,5-dimethyl-2,4-imidazolidinedione
(7) N,N'-Dibromo-5,5-diethylbarbituric acid
(8) N,N'-Dibromobarbituric acid
(9) N-Bromoisocyanuric acid
(10) N-Bromoacetamide
(11) N-Bromochloroacetamide
(12) N-Bromotrifluoroacetamide
(13) N-Bromacetanilide
(14) N-Bromobenzenesulfonylanilide
(15) N-Bromobenzamide
(16) N-Bromobenzenesulfonylamide
(17) N-Bromo-N-benzenesulfonylbenzenesulfonylamide
(18) N-Bromophthalazone
(19) N-Chlorosuccinimide
(20) N-Iodosuccinimide
(21) Trichloroisocyanuric acid
(22) N-Chlorophthalimide
(23) 1,3-Dichloro-5,5-dimethyl-2,4-imidazolidinedione
(24) 3-Chloro-5,5-dimethyl-2,4-imidazolidinedione
(25) 1,3-Diiodo-5,5-dimethyl-2,4-imidazolidinedione
(26) Trichloromelamine
(27) Tribromomelamine

(28) N-Bromocyclohexanedicarbonimide
(29) 1-Bromo-3,5,5-triethyl-2,4-imidazolidinedione
(30) 1-Bromo-3-ethyl-5,5-dimethyl-2,4-imidazolidinedione
(31) 1,3-Dibromo-5,5-diethyl-2,4-imidazolidinedione
(32) N,N-Dibromo-5,5-dimethylbarbituric acid
(33) N,N-Dibromo-5-ethyl-5-methylbarbituric acid
(34) N,N-Dibromo-5-ethyl-5-phenylbarbituric acid
(35) N,N'-Dibromoisocyanuric acid
(36) N-Bromoacetamide
(37) N-Bromonaphthamide
(38) N-Bromohydroxybenzamide
(39) N-Bromocarboxybenzamide
(40) N-Bromotoluensesulfonamide
(41) N-Bromo-N-toluenesulfonyltoluenesulfonylamide
(42) 1-Bromo-3,3,5-trimethyl-2,4-imidazolidinedithione
(43) 1-Bromo-3,5,5-triethyl-2,4-imidazolidinedithione
(44) 1-Bromo-3-ethyl-5,5-dimethyl-2,4-imidazolidinedithione
(45) 1,3-Dibromo-5,5-dimethyl-2,4-imidazolidinedithione
(46) 1,3-Dibromo-5,5-diethyl-2,4-imidazolidinedithione
(47) 1,3-Dichloro-5,5-dimethyl-2,4-imidazolidinedithione
(48) 3-Chloro-5,5-dimethyl-2,4-imidazolidinedithione
(49) 1,3-Diiodo-5,5-dimethyl-2,4-imidazolidinedithione
(50) N-Bromosaccharin
(51) N,N-Dibromo-5,5-dimethyl-2,4,6-pyrimidinetrione
(52) N,N-Dibromo-2,4,5-trioxypyrimidine (6) Other halogen containing compounds:

For example, triphenylmethyl chloride, triphenylmethyl bromide, 2-bromobutyric acid, 2-bromoethanol and dichlorobenzophenone, etc.

In the above-described processes and the process of the present invention, an improvement in photographic properties, such as an increase in sensitivity and an elimination of heatfog, etc., can be achieved by ripening by allowing the composition to stand at room temperature (about 20°-25° C.) or a higher temperature (30° C.-80° C.) for a suitable time (for example, 20 minutes to 48 hours) after the addition of the silver halide forming component.

The silver halide forming compound can be employed individually or as a combination thereof. A suitable amount of the silver halide forming component is about 0.001 to 0.5 mol, preferably about 0.01 to 0.3 mol, per mol of the organic silver salt employed as the component (a). If the amount is more than about 0.5 mol, the color changes, i.e., an undesirable coloration of the background ocurs on allowing the exposed and developed light-sensitive material to stand under normal room illumination. If the amount is less than about 0.001, the sensitivity is reduced.

As the sulfur-containing compounds employed as component (c) in the invention, any compound which can be used as a sulfur-sensitizer for a conventional silver halide emulsion can be used. Such sulfur-sensitizers can generally be described as compounds having at least one labile sulfur atom and are capable of forming silver sulfide on reaction with the organic silver salt or the silver halide.

Whether any individual compound can be employed as component (c) of the invention can be easily determined by a routine test. For example, after mixing a compound used as component (c) with the organic silver salt and the silver halide, and if desired heating, if it is desired to promote the decomposition of component (c), the X-ray diffracton pattern is examined to determine whether diffraction peaks inherent to silver sulfide are present. If so the compound is acceptable as component (c).

Preferred sulfur-containing compounds include the following inorganic and organic compounds.

(I) Examples of inorganic compounds:

Compounds represented by the following general formulae:

(1) $M^{I}_2S_2O_3$ (2) $M^{II}S_2O_3$ wherein $M^I$ represents a monovalent cation such as a hydrogen ion, an ammonium ion, a sodium ion or a potassium ion, and $M^{II}$ represents a divalent cation such as a barium ion, a magnesium ion, or a calcium ion. Examples of compounds represented by general formula (1) or (2) are:

(a) $Na_2S_2O_3$
(b) $K_2S_2O_3$
(c) $(NH_4)_2S_2O_3$
(d) $CaS_2O_3$
(e) $SrS_2O_3$
(f) $FeS_2O_3$
(g) $BaS_2O_3$
(h) $Tl_2S_2O_3$ (II) Examples of organic compounds:

(3) Organic compounds having a —CS—$NR_1$— unit in the molecule thereof, where in the unit formula $R_1$ represents a hydrogen atom or a substituent containing 12 or less carbon atoms. As examples of preferred $R_1$ groups, there are alkyl groups, i.e., substituted or unsubstituted alkyl groups including carboxy and aryl substituted alkyl groups such as a methyl group, an ethyl group, a propyl group, a t-butyl group, a carboxymethyl group, a carboxyethyl group, a phenylmethyl group, etc.; an alkenyl group such as a butenyl, hexenyl or allyl group, etc.; an aryl group, i.e., a substituted or unsubstituted aryl group of 6 to 18 carbon atoms, preferably 6 to 12 carbon atoms, including alkyl, carboxy and carboxyalkyl substituted aryl groups, such as a substituted or unsabstituted phenyl group, a tolyl group, a carboxyphenyl group, etc.; an acyl group such as an acetyl group, a propionyl group, etc., and the like. Specific examples of organic compound (3) include the compounds represented by the following general formula (31);

$$R_2—CS—NR_1R_3 \qquad (31)$$

wherein $R_1$ is as difined above and $R_2$ represents a substituent containing 24 or less carbon atoms which may contain hydrogen atoms, nitrogen atoms, oxygen atoms, sulfur atoms and the like, preferably 1 to 4 nitrogen atoms and/or 0 to 4 sulfur atoms and $R_3$ is the same as $R_1$. As preferred $R_2$ groups, there are illustrated those represented by the following general formulae.

(311) $R_4R_5N—$ (312) $R_6R_7N—CS—NR_8—NR_9—$

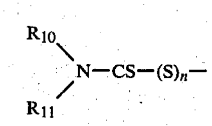
(313)

(314) $R_{12}R_{13}C—N—NR_{14}—$

In general formulae (311) to (314) above, $R_4$, $R_5$, $R_6$, $R_7$, $R_8$, $R_9$, $R_{10}$, $R_{11}$, $R_{12}$, $R_{13}$ and $R_{14}$ are the same as $R_1$, n represents an integer of 1 to 3.

(315) MS— wherein M represents a hydrogen atom or an alkali metal atom.

With compounds represented by general formula (31), those compounds having a $$(CS-\underset{H}{N})$$

unit are preferred.

Examples of compounds represented by the general formula (31) are as follows:

(31-a) $C_2H_5NHCSN(C_2H_5)_2$
(31b) $(CH_3)_2NCSNH_2$
(31-c) $CH_3NHCSNH_2$
(31-d) $CH_2{=}CHCH_2NHCSNH_2$
(31-e) $C_6H_5NHCSNHC_6H_5$
(31-f) $CH_3CONHCSNH_2$
(31-g) $n{-}C_3H_7NHCSNH{-}n{-}C_3H_7$
(31-h) $NH_2CSNHNHCSNH_2$
(31-i) $(CH_3)_2NCS{-}S{-}S{-}CSN(CH_3)_2$
(31-k) $(C_2H_5)_2C{=}N{-}NHCSNHC_2H_5$
(31-l) $CH_3NHCSSH$
(31-m) $C_6H_5NHCS{-}SNa$

Additional specific examples of organic compound (3) include those represented general formula (32);

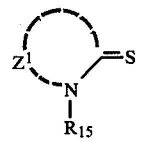

(32)

wherein $Z^1$ represents the atoms necessary to form a 5- or 6- membered hetero ring, which hetero ring may be fused with an aromatic ring, e.g., a benzene ring, which can be alkyl, alkoxy, etc., substituted. As atoms comprising the hetero ring represented by Z, there are carbon atoms, nitrogen atoms, sulfur atoms, oxygen atoms and selenium atoms. As the specific examples of hetero ring $Z^1$, there are an oxazolidine ring, a thiazolidine ring, an imidazolidine ring, an isoxazolidine ring, a pyrazolidine ring, an isothiazolidine ring, a tetrahydrotriazole ring, a pyrimidine ring, a quinazolidine ring, and oxo- or thioxo group- containing hetero rings thereof. Particularly preferred hetero rings are a rhodanine nucleus, a thiohydantoin nucleus, a thiourazol nucleus, a dithiourazol nucleus, a 2-thio-2,4-oxazolidinedione nucleus, a thiouracil nucleus, and the like. Furthermore, these hetero rings can be substituted with wubstituent having 24 or less carbon atoms such as an alkyl group, i.e., a substituted or unsubstituted alkyl group, e.g., aryl or carboxy substituted (e.g., a methyl group, an ethyl group, a t-butyl group, a carboxymethyl group, a carboxyethyl group, etc.), an alkylidene group, i.e., a substituted or unsubstituted alkylidene groups, e.g., alkyl, carboxy or carboxyalkyl substituted such as an ethylidene group, a propylidene group, an isopropylidene group, a carboxyphenylethylidene group, etc.), an aryl group, i.e., a substituted or unsubstituted $C_6$–$C_{18}$, preferably $C_6$–$C_{12}$, aryl group, e.g., alkyl, carboxy or carboxyalkyl substituted, such as a phenyl group, a tolyl group, a carboxyphenyl group, etc.), an arylidene group, e.g., alkyl, carboxy or carboxyalkyl substituted (e.g., a benzylidene group, a tolylidene group, a carboxybenzylidene group, etc.), or the like. In particular, markedly effective compounds are compounds having an alkylidene group or an arylidene group, e.g.,

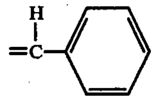 or 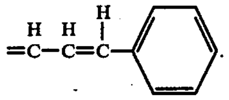.

In general formula (32), $R_{15}$ represents a hydrogen atom or a substituent having 12 or less carbon atoms, specifically, an alkyl group, e.g., a preferably a $C_1$–$C_4$ alkyl group including aryl and carboxy substituent alkyl groups (e.g., a methyl group, an ethyl group, a propyl group, a t-butyl group, a carboxymethyl group, a carboxyethyl group, a phenylmethyl group, etc.), an alkenyl group (e.g., an allyl group, etc.), or an aryl group, e.g., a $C_6$–$C_{18}$, preferably $C_6$–$C_{12}$, aryl group including alkyl, carboxy and [carboxy alkyl] groups (e.g., a phenyl group, a tolyl group, a carboxyphenyl group, etc.).

Specific examples of the compounds represented by general formula (32) are as follows.

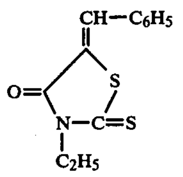

(32-1)

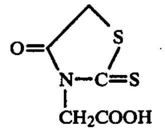

(32-2)

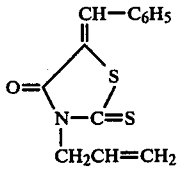

(32-3)

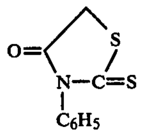

(32-4)

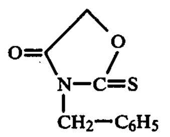

(32-5)

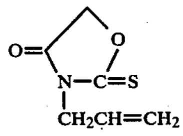

(32-6)

-continued
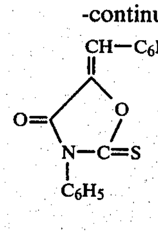
(32-7)
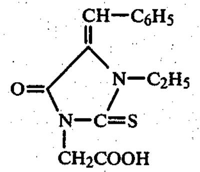
(32-8)
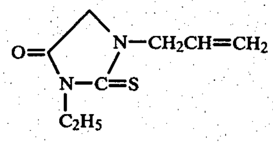
(32-9)
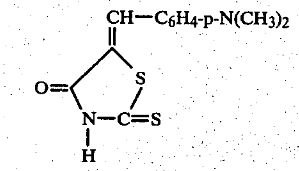
(32-10)
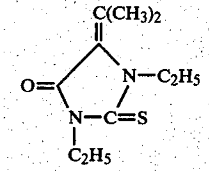
(32-11)
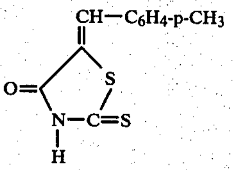
(32-12)
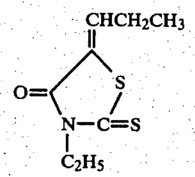
(32-13)
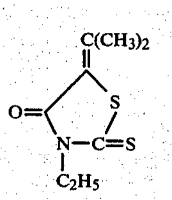
(32-14)
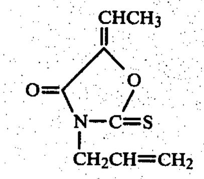
(32-15)
-continued
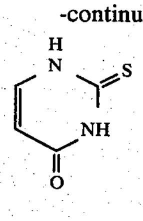
(32-16)
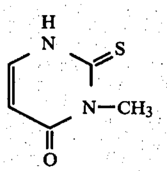
(32-17)
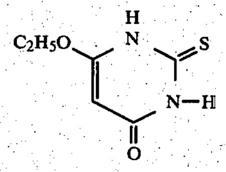
(32-18)
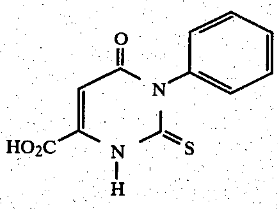
(32-19)
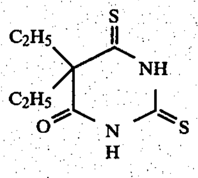
(32-20)
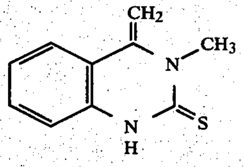
(32-21)
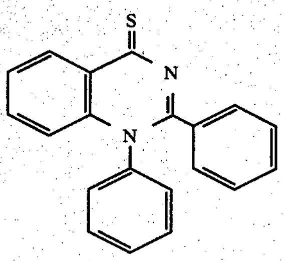
(32-22)
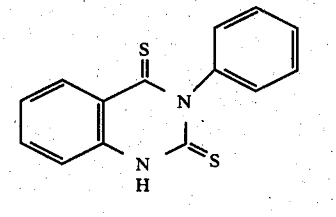
(32-23)

-continued

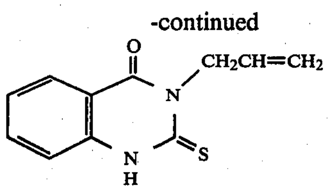

(32-24)

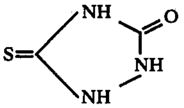

(32-25)

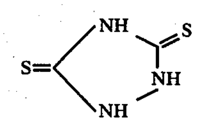

(32-26)

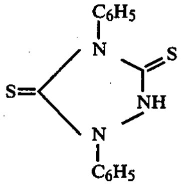

(32-27)

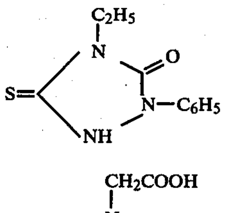

(32-28)

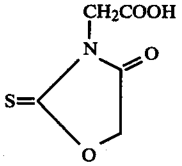

(32-29)

(4) Organic compounds represented by the following general formula (4);

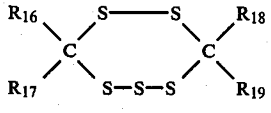

(4)

wherein $R_{16}$, $R_{17}$, $R_{18}$ and $R_{19}$ each represents a hydrogen atom or a substituent containing 12 or less carbon atoms. Prefered substituents as $R_{16}$, $R_{17}$, $R_{18}$ or $R_{19}$ include alkyl groups, i.e., substituted or unsubstituted alkyl groups such as aryl or carboxy substituted alkyl groups, e.g., a methyl group, an ethyl group, a propyl group, a phenylmethyl group, etc.

Specific examples of compounds represented by general formula (4) are as follows:

(4-a)

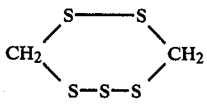

(4-b)

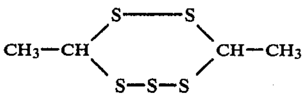

Mixtures of Compounds (1)-(4) can, of course, be used if desired.

These sulfur-containing compounds are described in, for example, U.S. Pat. Nos. 1,574,944, 1,623,499, 2,278,947, 2,399,083, 2,410,689, 2,440,206, 2,449,153, 3,189,458, 3,297,446, 3,297,447 and 3,501,313, German Pat. Nos. 971,436, 1,422,869, 1,572,260 and 2,055,103, French Pat. Nos. 1,307,754, 2,059,245 and 2,064,204, British Pat. No. 1,129,356, Belgian Pat. No. 624,013 and Japanese Pat. Application (OPI) 5887/72.

The amount of sulfur-containing compound used in the invention is not limited and can be easily determined by one skilled in the art. Generally, it can be used in an amount from about $10^{-8}$ mol to about $10^{-2}$ mol, preferably from $10^{-7}$ mol to $10^{-3}$ mol, per 7 mol of the organic silver salt. The more the amount exceeds the upper limit, the more the resulting light-sensitive material exhibits, while as amounts more and more below the lower limit are used, the lower are the effects of the present invention.

The sulfur-containing compounds are usually added used as a solution or a dispersion in a suitable solvent. The addition can be conducted at any stage of forming the light-sensitive composition, i.e., before or during the reaction forming an organic silver salt, or before or during the reaction of simultaneously forming an organic silver salt and silver halide, or before or during the reaction of a halogen-containing compound with a previously prepared organic silver salt, to a composition containing an organic silver salt and silver halide prepared according to the above-described processes.

In the present invention, the thus prepared composition containing (a) an organic silver salt, (b) a light-sensitive a silver halide and the sulfur-containing compound is heated. Although heating temperature is not limited, it is generally within the range of from about 25° to 80° C., preferably 30° C. to 70° C., and a heating time within the range of about 5 minutes to about 300 minutes, preferably 10 minutes to 180 minutes is used. The preferred heating conditions vary depending upon the kinds and properties of the organic silver salt, light-sensitive silver halide and the sulfur-containing compound used, and can easily be established after repeated runs with selected combinations of ingredients.

While the above bounds establish extremely preferred processing conditions in accordance with the present invention, there are not to be construed as limitative. The general rules are that at exceedingly long heating times or at exceedingly high heating temperatures, a sensitivity increase is no longer encountered and fog increases. One skilled in the art can, of course, use longer times in correlation with lower temperatures or higher temperatures in correlation with lower times than those set forth above, so long as the sensitivity peak is not passed.

On the other hand, when extremely short times are used or extremely low temperatures are used, a lessened sensitivity increase is obtained. It is thus seen that the minimum temperature and time parameters are somewhat less critical than the maximum temperature and time parameters.

It is to be specifically emphasized that the heating of components (a) and (b) in the presence of the sulfur containing compound in accordance with the present invention is a particularly preferred embodiment of the present invention, and in effect this procedure differs from a process such as, for example, mixing an organic silver salt with a silver halide emulsion which has been pre-sensitized with sulfur.

We have further discovered that the photographic characteristics of the composition of the invention can be improved by using in combination with a sulfur-containing compound one or more of the following compounds (1) to (3);

(1) A Lithium salt of a carboxylic acid having 10 or more carbon atoms which can be represented by the following general formula (I)

$$R_{20}COOLi \qquad (I)$$

wherein $R_{20}$ represents a substituent containing 9 or more carbon atoms, preferably up to 24 carbon atoms, which may contain hydrogen, a halogen, oxygen, nitrogen, sulfur or like non-metallic atoms.

Those which are preferred for use in the present invention are those where $R_{20}$ contains 11–31 carbon atoms and which may contain an oxygen atom. In particular, lithium salts of straight chain carboxylic acids are preferred. The above-described lithium carboxylicate can contain an unsaturated bond or can be a lithium salt of straight chain dicarboxylic acid.

Various processes for producing such lithium carboxylates are known, and the starting materials therefor are commercially available. As the simplest process which provides pure lithium carboxylate, there is the process which comprises preparing a dilute organic silvent solution the desired carboxylic acid (for example, a water-soluble organic solvent such as methanol or ethanol can be used) and adding dropwise thereto an aqueous solution of lithium hydroxide. In this case, it is necessary to control the amount of lithium hydroxide so it does not exceed the molar amount of carboxylic acid to avoid contamination of the product with residual lithium hydroxide, a strong alkali. The thus produced lithium carboxylate is of crystal form, and can be obtained by filtration from the reaction system, washing several times with water, and drying.

As specific examples of lithium carboxylates, there are lithium laurate, lithium palmitate, lithium myristate, lithium stearate, lithium behenate, lithium 1,14-tetradecanedioate, lithium 1,16-hexadecanedioate, lithium 1,12-dodecanedioate, lithium erucate, lithium brassidate, lithium docosenylsuccinate, lithium octadecanylsuccinate, lithium docosenylglutarate, lithium docosenyladipate, lithium tetradecanyladipate, lithium tetradecanylheptanedipate, etc.

The lithium carboxylate can be added to the composition containing components (a) and (b) in various fashion, e.g., it can be added to the composition simultaneously with the addition of the component (c) or added before or after component (c) is added to components (a) or (b). In short, all that is required is that ingredient (c) and the lithium carboxylate be present in the composition when the composition is heated. As one special embodiment, it is possible to react a lithium salt with a carboxylic acid or the salt thereof before or during the formation of the organic silver salt to thereby produce lithium carboxylate.

Although the amount of the lithium carboxylate added is not particularly limited, it is generally within the range of from about 0.0001 mole to about 2 moles, preferably from about 0.001 to about 1 mole, per mole of the organic silver salt. If the amount is too high, the amount of solids other than image-forming ingredients becomes so large that uniform composition are difficult to maintain, and the coated surface is liable to become coarse. On the other hand, if it is too small, the beneficial effects of the lithium carboxylate are not obtained.

(2) Conpounds containing a —CONH— residue:

Compounds represented by the following general formulae (II) to (IV), particularly sulfur atom-free compounds, are preferred.

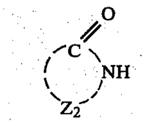

(II)

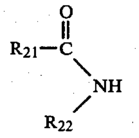

(III)

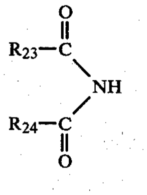

(IV)

In the above formulae, $Z_2$ represents the atoms necessary to form a 4- to 8-membered ring, which can be fused with another ring or rings. As specific examples of 5- or 6-membered rings, there are a pyrrole ring, a pyrroline ring, a pyrrolidine ring, an imidazoline ring, an imidazolidine ring, a pyrazoline ring, a pyrazolidine ring, a piperidine ring, an oxazine ring, a piperadine ring, a hydantoin ring, a cyanuric ring, a hexahydrotriazine ring, an indoline ring, an oxazolidine ring, etc. Also, $Z_2$ can form a 4- to 8-membered lactam ring, which can, if desired, be substituted with, e.g., an alkyl group, an aryl group, an alkoxy group, oxygen (=O), etc. As alkyl groups, those of 1–18 carbon atoms such as a methyl group, an ethyl group, a propyl group, an isopropyl group, a butyl group, an isobutyl group, a t-butyl group, a pentyl group, a hexyl group, a 2-ethylhexyl group, an octyl group, a nonyl group, a decyl group, a dodecyl group, etc. are preferred. In particular, those which have 1–8 carbon atoms are most preferred. As the aryl group, an unsubstituted phenyl group or a substituted phenyl group containing, for example, an alkyl group having 1–4 carbon atoms (e.g., a methyl group, an ethyl group, a propyl group, an isopropyl group, a butyl group, etc.), a halogen atom (e.g., chlorine, bromine, iodine, etc.), a naphthyl group, and the like) are preferred. As the alkoxy group, those which possess 1–12 carbon atoms such as a methoxy group, an ethoxy group, a propoxy group, an isopropoxy group, a butoxy group, a t-butoxy group, a pentoxy group, a hexoxy group, an octoxy group, a dodecyloxy group, etc., are preferred. In particular, those which have 1–8 carbon atoms are most preferred. 4- to 8-membered lactam rings in general are particularly preferred for use in this embodiment of present invention.

$R_{21}$ and $R_{22}$ each represents a hydrogen atom, an alkyl group, an aryl group or an alkoxy group, and $R_{23}$ and $R_{24}$ each represents an aryl group or an alkyl group. As the alkyl and alkoxy group, those which have 1-18 carbon atoms as set forth above are preferred, and those having 1-8 carbon atoms are particularly preferred. As the aryl group, an unsubstituted or substituted pheny group and an unsubstituted or substituted naphthyl group as set forth above are illustrative. $R_{21}$ and $R_{22}$ may also possess a substituent such as a carboxy group, if desired.

In the present invention, compounds represented by the foregoing general formula (III) are particularly preferred.

Specific examples of compound used in the present invention represented by the aforesaid general formula include the following compounds:

(1) formamide
(2) N-ethyl formamide
(3) N-allyl formamide
(4) acetamide
(5) acetomethylamide
(6) acetoethylamide
(7) propylamide
(8) butyramide
(9) N-methylbutyramide
(10) hexylamide
(11) dodecylamide
(12) N-methyldodecylamide
(13) tetradecanylamide
(14) formanilide
(15) acetanilide
(16) benzamide
(17) dibenzamide
(18) benzanilide
(19) α-benzamidoisobutyric acid
(20) ε-benzamidocaproic acid
(21) benzoylaspartic acid
(22) succinimide
(23) phthalimide
(24) glutarimide
(25) 3,5,5-trimethyl-2,4-imidazolidinedione
(26) 5,5-dimethyl-2,4-imidazolidinedione
(27) 5,5-diethylbarbituric acid
(28) barbituric acid
(29) isocyanuric acid
(30) phthalazone
(31) melamine
(32) naphthamide
(33) hydroxybenzamide
(34) saccharin
(35) ε-caprolactam
(36) β-propiolactam
(37) γ-valerolactam
(38) δ-valerolactam
(39) heptolactam
(40) 1-phenylurazol
(41) 1-phenyl-2-methylurazol
(42) quinazoline
(43) methylquinazoline
(44) oxtylamide These compounds having a —CONH— residue can be added to a composition containing components (a) and (b) in various fashions to insure the same are present in the final light-sensitive composition, i.e., added simultaneously with component (c) or before or after the addition of component (c). All that is required is that component (c) and the compound having a —CONH— residue be present with components (a) and (b) in the composition when it is heated. It is particularly preferred to add the compound containing a —CONH—residue to a mixture of components (a), (b) and (c) since high sensitizing efficiency results. Although the amount of the compound having a —CONH— residue is not particularly limited, it is generally in the range of from about 0.001 mole to about 2 moles, preferably from about 0.005 to about 1 mole, per mole of organic silver salt. If the amount is too large, the content of ingredient other than image-forming ingredients becomes too great and an image having a high $D_{max}$ is not obtained, while if the amount is too small, the effect of the compound having a —CONH— residue becomes insufficient.

(3) Oxidizing Agent:

Oxidizing agents which are preferably used in the present invention can be defined as compounds capable of oxidizing silver (having a valency of zero).

Mixtures of various of compounds (1), (2) and (3) can, of course, be used, if desired.

Preferred oxidizing agents are those compounds which release a halogen atom such as a bromine atom, a chlorine atom, etc., or an oxygen atom upon heating in the presence of metalic silver.

As the oxidizing agent used in the present invention, there can be illustrated the following: a halogen gas such as chlorine gas, bromine gas, etc.; an aqueous solution of halogen gas such as bromine water; chloric acid or a chlorate (e.g., potassium chlorate, sodium chlorate, etc.); hypochlorous acid or a hypochlorite (e.g., sodium hypochlorite, calcium hypochlorite, etc.); bromic acid or a bromate (e.g., sodium bromate, potassium bromate, calcium bromate, etc.); hypobromous acid or a hypobromite (e.g., sodium hypobromite, calcium hypobromite, potassium hypobromite, etc.); ozone gas; peroxides represented by the following general formulae (V)-(IX), $$M^{III}{}_2O_2 \qquad (V)$$

$$N^{IV}O_2 \qquad (VI)$$

wherein $M^{III}$ represents Li, Na, K, $NH_4$, Rb, Cs, Ag or H, and $M^{IV}$ represents Mg, Ca, Sr, Ba, Zn, Cd or Hg, $$R_{25}—O—O—R_{26} \qquad (VII)$$

wherein $R_{25}$ and $R_{26}$ each represents a hydrogen atom or a substituent containing 1-12 carbon atoms, preferably an alkyl group having 1-8 carbon atoms, (e.g., a methyl group, an ethyl group, an isopropyl group, a butyl group, etc.). Specific examples include ethyl peroxide, isopropyl peroxide, butyl peroxide, etc.

$$R_{27}\underset{\underset{O}{\|}}{C}—O—O—\underset{\underset{O}{\|}}{C}—R_{28} \qquad (VIII)$$

In general formula (VIII), $R_{27}$ and $R_{28}$ each represents a substituent having 1-22 carbon atoms, preferably an aryl group having 6-18, preferably 6-12, carbon atoms (e.g., a phenyl group, a naphthyl group, etc.) or an alkyl group having 1-8 carbon atoms, preferably 1-4 carbon atoms (e.g., a methyl group, an ethyl group, an isopropyl group, a butyl group, etc.). Specific examples include diacetyl peroxide, dibenzoyl peroxide, naphthoyl peroxide, etc.

Peroxo acids and peroxo acid salts: specific examples include peroxonitrates (e.g., potassium peroxonitrate, sodium peroxonitrate, etc.), peroxocarbonates (e.g., sodium peroxocarbonate, potassium peroxocarbonate, etc.), peroxodisulfuric acid, peroxodisulfates (e.g., ammonium peroxodisulfate, potassium peroxodisulfate, sodium peroxodisulfate, rubidium peroxodisulfate, etc.), peroxoborates (e.g., ammonium peroxoborate, potassium peroxoborate, sodium peroxoborate, etc.), and the like.

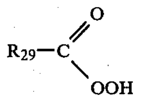

(IX)

In general formula (IX), $R_{29}$ represents a hydrogen atom or a substituent containing 1–24 carbon atoms, preferably an alkyl group having 1–12, preferably 1–8, carbon atoms (e.g., a methyl group, an ethyl group, a propyl group, an octyl group, etc.) or an aryl group having 6–18 carbon atoms (e.g., a phenyl group, a tolyl group, a naphthyl group, etc.). Specific examples thereof include performic acid, peracetic acid, perbenzoic acid, perphthalic acid, etc.

Further, N-halogeno compounds as earlier exemplified for silver halide forming ingredients can also be used as an oxidizing agent. In addition, halogen-containing compounds such as carbon tetrabromide, 2-bromoethanol, triphenylmethyl bromide, 2-bromobutyric acid, etc., can also be used as an oxidizing agent in the present invention.

Compounds particularly preferred for the present invention are ozone, peroxides and peracids. Ozone, peroxides and peracids scarcely increase light-discoloration (unfavorable coloration in background areas to be caused upon leaving a processed light-sensitive material under room light), while halogen-releasing oxidizing agents sometimes increase light-discoloration. Usually, oxidizing agent is used in an amount of about $10^{-5}$ mole to about $3\times10^{-1}$ mole, preferably $10^{-3}$ mole to $10^{-1}$ mole, per 1 mole of an organic silver salt, but this range is not limitative.

After the addition of the oxidizing agent, heating is conducted usually at a temperature of from about 30°–80° C. for 3 minutes to 120 minutes, preferably 35°–55° C. for 5–60 minutes.

As the heating temperature becomes low and as the heating time is shortened, the effects of the oxidizing agent is more deteriorated. On the other hand, as the heating temperature becomes high and as the heating time is prolonged, there is observed the tendency of increase in fog.

Suitable heating temperature and heating time vary depending upon the kinds of the oxidizing agent and the composition used. Therefore, heating conditions are decided through careful experiments. Heat-processing in the presence of the oxidizing agent, can similarly be conducted by incorporating the oxidizing agent in the composition comprising the ingredients (a) and (b) prior to the addition to a sulfur-containing compound, ingredient (c), to be described hereinafter and heating the composition, or by incorporating both ingredients (c) and an oxidizing agent in the composition comprising ingredients (a) and (b) and heating this composition. In particular, there can be obtained the most preferable results by heating the composition comprising ingredients (a) and (b) in the presence of an oxidizing agent prior to heating in the presence of the sulfur-containing compound.

It is particularly preferred to add ingredient (c) after adding the oxidizing agent to a mixture of ingredients (a) and (b) and heating, since there can be obtained high sensitizing efficiency with less heat fog. Also, it is preferred to be use the combination of ingredient (c), a lithium salt of a carboxylic acid and a

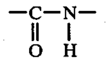

containing compound plus an oxidizing agent as described hereinbefore, since high sensitizing efficiency can be obtained.

As described above, the composition prepared according to the process of the present invention can be per se highly sensitized. However, if desired, it can further be chemically sensitized using sulfur, selenium, or tellurium compounds, gold, platinum, or palladium compounds, or like chemical sensitizer, stannous halide or a like reducing agent, or a combination thereof. Individual substances are described in, e.g., U.S. Pat. Nos. 1,623,499, 2,399,083 and 3,297,447. It is preferred to add to the light-sensitive silver halide emulsion prepared according to the present invention an antifogging, stabilizing agent such as a thiazolium salt, an azaindene, a mercury salt, urazol, sulfocatechol, oxime, nitron, nitroindazole, etc., in order to stabilize against the formation of fog.

The preparation of a thermally developable light-sensitive material which is the object of the present invention requires, in addition to the compound of the present invention, a reducing agent to be used in combination therewith. The reducing agent functions to reduce the organic silver salt, upon heating the thermally developable light-sensitive material containing exposed silver halide, to produce silver which yields an image. As the reducing agent, at least one suitable compound is selected taking into consideration the kind and properties of the organic silver salt used. Examples of such reducing agents include substituted phenols, substituted or unsubstituted bisphenols, substituted or unsubstituted mono- or bisnaphthols, di - or polyhydroxybenzenes, di- or polyhydroxynaphthalenes, hydroquinone monoethers, ascorbic acid and derivatives thereof, 3-pyrazolidones, pyrazoline-5-ones, reducing saccharides, aromatic primary amino compounds, reductones, kojic acid, hinikitiol, hydroxylamines, hydroxytetronic acids, hydroxytetronic acid amides, hydroxamic acids, sulfhydrooxamic acids, hydrazides, indan-1,3-diones and p-oxyphenylglycines, etc. Of these reducing agents, reducing agents which are photolytically decomposed are preferred. Photolytically decomposable reducing agents are described in U.S. Pat. No. 3,827,889. Further, it is possible to use the reducing agents together with compounds which accelerate photolysis, as described in U.S. Pat. No. 3,756,829. Blocked bisphenol type reducing agents are also used as preferred compounds and have been described in, for example U.S. Pat. No. 3,589,903 and German Patent Applications (OLS) No. 2,434,415. Examples of other reducing agents which can be used in the present invention are described in U.S. Pat. Nos. 3,152,904, 3,457,075, 3,531,286, 3,615,533, 3,679,426, 3,672,904, 3,751,252, 3,751,255, 3,782,949, 3,770,448 and 3,773,512, U.S. Pat. No. 3,819,382 and Belgian Pat. No. 786,086.

Specific examples of suitable reducing agents are as follows:

(1) Substituted phenols:

Aminophenols, for example, 2,4-diaminophenol, methylaminophenol, p-aminophenol, o-aminophenol, 2-methoxy-4-aminophenol and 2-β-hydroxyethyl-4-aminophenol, etc.; alkyl-substituted phenols, for example, p-t-butylphenol, p-t-amylphenol, p-cresol, 2,6-di-t-butyl-p-cresol, p-ethylphenol, p-sec-butylphenol, 2,3-dimethylphenol, 3,4-xylenol, 2,4-xylenol, 2,4-di-t-butylphenol, 2,4,5-trimethylphenol, p-nonylphenol and p-octylphenol, etc.; other phenols, for example, p-acetophenol, p-acetoacetyl-4-methylphenol, 1,4-dimethoxyphenol, 2,6-dimethoxyphenol, chlorothymol, 3,5-di-t-butyl-4-hydroxybenzyl-dimethylamine, and sulfonamidophenols, for example, compounds described in U.S. Pat. No. 3,801,321; and novolak resin type reaction products of formaldehyde and phenol derivatives (for example, 4-methoxyphenol, m-cresol, o- or p-butylphenol, 2,6-di-t-butylphenol and mixtures thereof, etc.);

(2) Substituted or unsubstituted bisphenols:

o-bis-Phenols, for example, 1,1-bis-(2-hydroxy-3,5-dimethylphenyl)-3,5-trimethylhexane, bis-(2-hydroxy-3-t-butyl-5-methyl-phenyl)methane, bis-(2-hydroxy-3,5-di-t-butylphenyl) methane, bis-(2-hydroxy-3-t-butyl-5-ethylphenyl)methane, 2,6-methylene-bis-(2-hydroxy-3-t-butyl-5-methylphenyl)-4-methylphenol, 1,1-bis-(5-chloro-2-hydroxyphenyl)methane, 2,2'-methylene-bis-4-methyl-6-(1-methylcyclohexyl)phenol, 1,1-bis-(2-hydroxy-3,5-dimethylphenyl)-2-methylpropane, 1,1,5,5-tetrakis-(2-hydroxy-3,5-dimethylphenyl)-2,4-ethylpentane and 3,3',5,5'-tetramethyl-6,6'-dihydroxy-triphenylmethane; p-bis-phenols, for example, bisphenol A, 4,4'-methylene-bis-(3-methyl-5-t-butylphenol), 4,4'-methylene-bis-(2,6-di-t-heptylidene)-di-(o-cresol), 4,4'-ethylidene-bis-(2,6-di-tert-butylphenol), 4,4'-(2-butylidene)-di-(2,6-xylenol), 4,4'-(p-methylbenzylidene)-di-(o-cresol), 4,4'-(p-methoxybenzylidene)-bis-(2,6-di-tert-butylphenol), 4,4'-(p-nitrobenzylidene)-di-(2,6-xylenol) and 4,4'-(p-hydroxy-benzylidene)-di-(o-cresol); and others, for example, 3,5-di-t-butyl-4-hydroxybenzyldimethylamine, polyphenols such as α,α',-(3,5-di-t-butyl-4-hydroxyphenyl)dimethylether, 2,4,6-tris-(3,5-di-t-butyl-4-hydroxybenzyl)phenol, N,N'-di-(4-hydroxyphenyl)-urea and tetrakis-[methylene-(3,5-di-t-butyl-4-hydroxyhydrocinnamate]methane, diethylstilbestrol, hexestrol, bis-(3,5-di-t-butyl-4-hydroxybenzyl)ether and 2,6-bis-(2'-hydroxy-3'-t-butyl-5'-hydroxybenzyl)-4-methylphenol, etc.

(3) Substituted or unsubstituted mono- or bis-naphthols and di- or polyhydroxynaphthalenes: bis-β-Naphthols, for example, 2,2'-dihydroxy-1,1'-binaphthyl, 6,6'-dibromo-2,2'-dihydroxy-1,1'-binaphthyl, 6,6'-dinitro-2,2'-dihydroxy-1,1'-binaphthyl, bis-(2-hydroxy-1-naphthyl)methane and 4,4'-dimethoxy-1,1'-dihydroxy-2,2'-binaphthyl; naphthols, for example, α-naphthol, β-naphthol, 1-hydroxy-4-aminonaphthalene, 1,5-dihydroxynaphthalene, 1,3-dihydroxynaphthalene, 1-hydroxy-2-phenyl-4-methoxynaphthalene, 1-hydroxy-2-methyl-4-methoxy-naphthalene, 1-hydroxy-4-methoxynaphthalene, 1,4-didydroxy-naphthalene, methylhydroxynaphthalene, sodium, 1-amino-2-naphthol-6-sulfonate, 1-naphthylamine-7-sulfonic acid an sulfonamido-naphthols.

(4) Di- or polyhydroxybenzenes and hydroxymonoethers (e.g., as described in, for example, U.S. Pat No. 3,801,321):

Hydroquinone; alkyl substituted hydroquinones, for example, methylhydroquinone, t-butylhydroquinone, 2,5-dimethylhydroquinone, 2,6-dimethylhydroquinone and t-octylhydroquinone, etc.; halogen-substituted hydroquinones, for example, chlorohydroquinone, dichlorohydroquinone and bromohydroquinone, etc.; alkoxy-substituted hydroquinone, for example, methoxyhydroquinone and ethoxyhydroquinone, etc.; other substituted hydroquinones, for example, phenylhydroquinone and hydroquinone monosulfonate, etc.; hydroquinone monoethers, for example, p-methoxyphenol, p-ethoxyphenol, hydroquinone monobenzyl ether, 2-t-butyl-4-methoxyphenol, 2,5-di-t-butyl-4-methoxyphenol, hydroquinone mono-n-propyl ether and hydroquinone mono-n-hexyl ether; and others, for example, catechol, pyrogallol, resorcinol, 1-chloro-2,4-dihydroxybenzene, 3,5-di-t-butyl-2,6-dihydroxybenzoic acid, 2,4-dihydroxybenzoic acid, 2,4-dihydroxyphenyl sulfide, methyl gallate, and propyl gallate, etc.

(5) Ascorbic acid and derivatives thereof:

-Ascorbic acid; isoascorbic acid; ascorbic acid monoesters, for example, ascorbic acid monolaurate, monomyristate, monopalmitate, monostearate and monobehenate; ascorbic acid diesters, for example, ascorbic acid dilaurate, dimyristate, dipalmitate and distearate; and the compounds described in U.S. Pat. No. 3,337,342.

(6) 3-Pyrazolines and pyrazolones:

For example, 1-phenyl-3-pyrazolidone, 4-methyl-4-hydroxymethyl-1-phenyl-3-pyrazolidone, the compounds described in British Pat. No. 930,572, and 1-(2-quinolyl)-3-methyl-5-pyrazolone, etc.

(7) Reducing saccharides:

For example, glucose and lactose, etc.

(8) Aromatic primary amino compounds:

Examples of typical compounds include N,N-diethyl-p-phenylene-diamine, 2-amino-5-diethylaminotoluene, 2-amino-5-(N-ethyl-N-laurylamino)toluene, 4-[N-ethyl-N-(β-hydroxyethyl)amino]aniline and 3-methyl-4-amino-N-ethyl-N-(β-hydroxyethyl)aniline, 4-amino-3-methyl-N-ethyl-N-(β-methanesulfoamidoethyl)aniline sesquisulfate monohydrate as described in U.S. Pat. No. 2,193,015, N-(2-amino-5-diethylaminophenylethyl)methanesulfoamide sulfate as described in U.S. Pat. No. 2,592,364, N,N-diemthyl-p-phenylenediamine hydrochloride and 3-methyl-4-amino-N-ethyl-N-methoxyethylaniline as described in Japanese Pat. Application (OPI) 64933/1973, and the inorganic salts thereof. These compounds have been described in L. F. A. Mason, *Photographic Processing Chemistry,* pages 226–229, Focal Press, London (1966).

(9) Hydroxylamines:

For example, N,N-di-(2-ethoxyethyl)hydroxylamine, etc.

(10) Reductones:

Anhydro-dihydroaminohexose reductones as described in, for example, U.S. Pat. No. 3,679,426, and linear aminoreductones as described in Belgian Pat. No. 786,086.

(11) Hydroxyamic acids:

For example, hydroxamic acids as described in U.S. Pat. Nos. 3,751,252 and 3,751,255.

(12) Hydrazides:

For example, hydroxy substituted aliphatic acid aryl hydrazides as described in U.S. Pat. No. 3,782,949.

(13) Other compounds:

For example, pyrazoline-5-ones as described in U.S. Pat. No. 3,770,448, indan-1,3-diones having at least one hydrogen atom at the 2-position thereof as described in U.S. Pat. No. 3,773,512; amidoximes as described in U.S. Pat. No. 3,794,488, and reducing agents as described in U.S. Pat. Nos. 3,615,533 and 3,819,382.

Of these reducing agents, compounds having an alkyl group (e.g., a methyl group, an ethyl group, a propyl group, an isopropyl group, a butyl group or an amyl group) on at least one position adjacent to the position at which a hydroxyl group is bonded to an aromatic nucleus are preferred becaused they are stable to light and color changes due to exposure to light are small. For example, mono-, bis-, tris or tetrakis phenols having a 2,6-dit-tert-butyl-phenol group are preferred examples of reducing agents. Typically examples of these compounds are (i) esters of carboxylic acids derived from phenols having a bulky substituent in at least one ortho-position with monohydric or polyhydric alcohols or phenols, and (ii) esters of alcohols derived from phenols having a bulky substituent in at least one ortho-position or phenols having a bulky substituent in at least one ortho-position with mono- or polycarboxylic acids. These esters can be represented by the formulae:

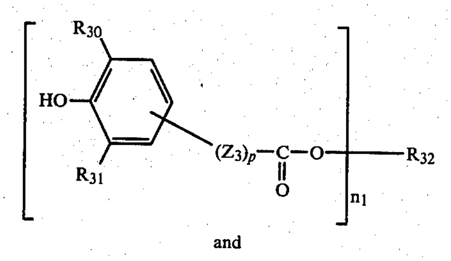

(X)

and

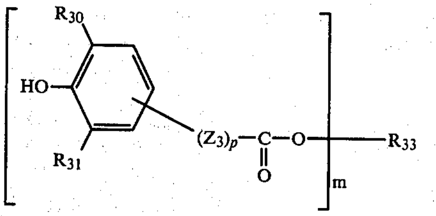

(XI)

wherein $Z_3$ is a divalent group containing up to 30 carbon atoms, $R_{30}$ is an alkyl group having 1 to 20 carbon atoms, $R_{31}$ is a hydrogen atom or an alkyl group having 1 to 20 carbon atoms, $R_{32}$ is an alcohol residue, $R_{33}$ is a carboxylic acid residue, $n_1$ and m each is a positive integer which is equal to the number of alcohol and carboxylic acid residues, respectively, esterified, and p is 0 or 1. Specific examples of these compounds include tetrakis[methylene-(3,5-di-tert-butyl-4-hydroxyhydrocinnamate)]-methane and octadecyl-3-(3',5'-di-tert-butyl-4'-hydroxyphenyl)-propionate.

It has been found that, of these esters, those represented by the following general formula (X) provide increased image density and a desirable black tone when used in combination with phthalazinones, which can be present in the composition according to the invention as a particularly desirable activator-toning agent as described hereinafter.

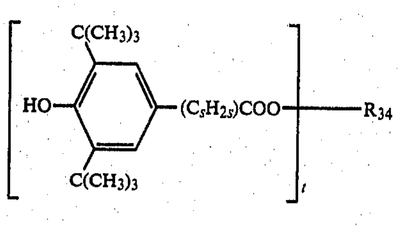

(XII)

wherein $R_{34}$ represents a residue of a saturated acyclic fatty alcohol represented by the formula $C_dH_{2d+2-t}$, wherein d represents a positive integer of from 1 to 18, t represents a positive integer of from 1 to 2d+2, and s represents 1, 2, 3 or 4.

Further, photodecomposable reducing agents such as ascorbic acid and the derivatives thereof, furoin, benzoin, dihydroxyacetone, glyceraldehyde, rhodizonic acid tetrahydroxyquinone, 4-methoxy-1-naphthol, etc., are preferred. They are decomposed by light even if the light-sensitive materials in which they are present are allowed to stand in the light after development, whereby reduction does not proceed and no color change occurs. Furthermore, direct positive images can be obtained by destroying the reducing agent upon imagewise exposure as disclosed in U.S. Pat. No. 3,756,829 and 3,827,889.

Two or more reducing agents can be used. Examples of two or more reducing agents used in combination are disclosed in Japanese Patent Application (OPI) No. 115540/74, U.S. Pat. Nos. 3,667,958 and 3,751,249. It has also been confirmed that the development can be accelerated by using the reducing agent in combination with a tin compound, an iron compound, a cobalt compound, or a nickel compound.

A suitable reducing agent is selected based on the combination of the organic silver salt employed as the component (a) with which the reducing agent is used. For example, a strong reducing agent is suitable for a silver salt such as a silver salt of benzotriazole or silver behenate which is comparatively difficult to reduce, and a weak reducing agent is suitable for a silver salt such as silver caprate or silver laurate which is comparatively easy to reduce. That is, once the organic silver salt is determined, the reducing agent can be selected depending on the organic silver salt. Suitable reducing agents for silver benzotriazole are 1-phenyl-3-pyrazolidones, ascorbic acid, ascorbic acid monesters and naphthols such as 4-methoxy-1-naphthols. Suitable reducing agents for silver behenate are o-bisphenols and hydroquinone. Suitable reducing agents for silver caprate and silver laurate are substituted tetrakispenols, p-bisphenols such as substituted bisphenol A, and p-phenylphenol. The selection of an appropriate reducing agent for the organic silver salt can be facilitated by using two or more reducing agents, e.g., the combination of small amount of a strong reducing agent and large amount of a weak or auxiliary reducing agent.

The amount of the reducing agent used in the invention can vary widely depending on the kind of organic silver salt used, the kind of reducing agent used and the other additives present, but the amount of the reducing agent is generally about 0.05 to about 5 mols, preferably 0.1 to 2 mols per mol of the organic silver salt.

If desired, an auxiliary reducing agent can be used in combination with the reducing agent employed. The amount of the auxiliary reducing agent used can be varied over a wide range, depending on the reducing power of the primary reducing agent(s) and the reducibility of the organic silver salt used, but a suitable amount of the auxiliary reducing agent generally is from about $10^{-5}$ to about 1 mole, preferably from $10^{-3}$ to 0.8 mole, per mole of the primary reducing agent. Examples of effective combinations of reducing agents include a combination of o- or p-bisphenols and the above described esters selected from the group consisting of esters of mono- or polyhydric phenols or alcohols with carboxylic acids derived from phenols having at least one bulky ortho-substituent, and esters of mono- or poly-carboxylic acids with polyhydric phenol having at least one bulky ortho-substituent or alcohols derived from phenols having at least one bulk ortho-substituent. By use of this combination, a heat developable light-sensitive element having reduced heatfogging, increased whiteness and improved light stability after development can be obtained.

In forming a black image of silver using the heat developable light-sensitive material, a color toning agent as an additive is preferably incorporated in the material. The color toning agent is used when it is derived to change the formed image into a deep color image, particularly into a black image. The amount of the color toning agent generally ranges from about 0.0001 mol to about 2 mols, preferably about 0.0005 mol to about 1 mol, per mol of the organic silver salt. Although the color toning agent which is most effective depends upon the organic silver salt and the reducing agent used, in general, heterocyclic organic compounds containing at least two hetero atoms wherein at least one nitrogen atom is present in the ring are used as a color toning agent. These compounds are described in, for example, U.S. Pat. No. 3,080,254. Phthalazone (phthalazinone), phthalic acid anhydride, 2-acetylphthalazinone, 2-phthaloylphthalazinone and substituted phthalazinone derivatives as described in West German Patent Application (OLS) No. 2,449,252 can also be suitably used in the present invention.

Examples of other effective color toning agents include pyrazolin-5-ones, cyclic imides and quinazolinone, as described in U.S. Pat. No. 3,846,136. For example, phthalimide, N-hydroxyphthalimide, N-potassium phthalimide and silver phthalimide are typical. Silver phthalazinone is also effective as a color toning agent. Other effective color toning agents are the mercapto compounds described in U.S. Pat. No. 3,832,186 and West German Patent Application (OLS) No. 2,321,217. In addition, the oxazinediones as described in West German Patent Application (OLS) No. 2,422,012, the phthalazine diones described in West German Patent Application (OLS) No. 2,449,252, the uracils described in German Patent Application (OLS) No. 2,506,320, the N-hydroxynaphthalimides described in U.S. Pat. No. 3,782,941, the substituted phthalimides described in West German Patent Application (OLS) Nos. 2,140,406, 2,141,063 and U.S. Pat. No. 3,844,797, and the phthalazinone derivatives described in West German Patent Application (OLS) No. 2,220,618 can be used.

Preferably each component used in the present invention is included in a binder so as to provide a homogeneous film on a support. Although preferred binders are generally hydrophobic, hydrophilic binders can also be used. These binders are transparent or semi-transparent. For example, proteins such as gelatin or gelatin derivatives, cellulose derivatives, polysaccharides such as dextran, natural materials such as gum arabic, vinyl latex compounds which increase the dimensional stability of the photographic materials and as synthetic polymers described hereinafter can be used. Preferred synthetic polymers are those described in U.S. Pat. Nos. 3,142,586, 3,193,386, 3,062,674, 3,220,844, 3,287,289 and 3,411,911. Effective polymers include water-insoluble polymers of alkyl acrylates and methacrylates, acrylic acid, sulfoalkyl acrylates or methacrylates, and compounds having a repeating sulfobetaine unit as described in Canadian Patent No. 774,054. Examples of preferred high molecular weight materials and resins include polyvinyl butyral, polyacrylamide, cellulose acetate butyrate, cellulose acetate propionate, polymethyl methacrylate, polyvinyl pyrrolidine, polystyrene, ethyl cellulose, polyvinyl chloride, chlorinated rubber, polyisobutylene, butadiene-styrene copolymers, vinyl chloride-vinyl acetate copolymers, vinyl acetate-vinyl chloride-maleic acid-terpolymers, polyvinyl alcohol, polyvinyl acetate, benzyl cellulose, polyvinyl acetate, acetylcellulose, cellulose propionate and cellulose acetate phthalate, etc. Of these polymers, polyvinyl butyral, polyvinyl acetate, ethyl cellulose, polymethyl methacrylate and cellulose acetae butyrate are more preferred. The most preferred material is polyvinyl butyral. If desired, two or more of these materials can be used as a mixture. The ratio by weight of the binder to the organic silver salt of component (a) generally ranges from about 10:1 to about 1:10 and preferably about 4:1 to about 1:4.

The layers containing each component described herein and other layers in the heat-developable light-sensitive material can be applied any conventional support as is used in this art. Examples of supports which can be used in the present invention are synthetic resin films such as cellulose nitrate films, cellulose ester films, polyvinyl acetal films, polyethylene films, polyethylene terephthalate films or polycarbonate films, etc., glass plates, paper and metal plates such as an aluminium plate, etc. Partially acetylated materials can also be used. Further, baryta paper, synthetic resin coated paper and waterresistant paper can be used as well. It is further preferred from the viewpoint of handling that the support is flexible. Art paper, coated paper and clay process paper are preferred as paper supports. Paper which has been sized with a polysaccharide, etc., is also preferred.

The organic silver salt and the silver halide are each used in the amount such that the sum total of the silver of both coated on the support is about 0.2 g to about 3 g, preferably about 0.3 g to about 2 g, per $m^2$ of the support. If the amount coated is below about 0.2 g, image density is low. If the amount coated is above about 3 g, cost is increased while no additional advantages in photographic properties are achieved.

In one preferred embodiment in accordance with the present invention, all heat developable light-sensitive components are present in mono-layer form, that is, a mono-layer of the organic silver salt, photosensitive silver halide(s), reducing agent(s), binder, and sulfur-containing compounds(s). Needless to say, as will be obvious to one skilled in the art, conventional toning agents, sensitizing dyes, antifogging agents and the like can also be added.

In an another highly preferred embodiment of the present invention, multi-layer elements are formed. For example, the organic silver salt(s), photosensitive silver halide(s), binder and sulfur-containing compound(s) are present in the same layer (termed as photosensitive layer). Sensitizing dyes, if used, are also preferably in the photosensitive layer. The reducing agent(s) can be either in the photosensitive layer or in another layer adjacent thereto. When the reducing agent is not present in a photosensitive layer, it can be present in a layer either on top of or under the photosensitive layer and, if desired, an intermediate layer can be provided between the two layers, subject to the proviso, of course, then upon heat-development all image-forming components can be brought into reactive contact.

Toning agents can be present in the photosensitive layer, a layer containing the reducing agent or in another layer(s). If desired, in fact, a separate layer of toning agent can be provided at any desired point in the element, as a toning agent-containing layer need not necessarily be adjacent to other layers and can be separated therefrom by an intermediate layer.

Certain spectral sensitizing dyes which are known to be effective for gelatin-silver halide emulsions can be used in the composition of the present invention to further increase sensitivity. Effective spectral sensitizing dyes include cyanine, merocyanine, complex (trinuclear or tetranuclear) cyanine, holopolar cyanine, styryl, hemicyanine, oxonol and hemioxonol dyes. Of the cyanine dyes, those containing a basic nucleus such as a thiazoline, oxazoline, pyrroline, pyridine, oxazole, thiazole, selenazole, or imidazole ring are suitable. Further, such a nucleus can have an alkyl group, an alkylene group, a hydroxyalkyl group, a sulfoalkyl group, a carboxyalkyl group, an aminoalkyl group or an enamine group as a substituent or can form a condensed carbocyclic group or heterocyclic group. The cyanine dyes can be either symmetric or asymmetric. Further, the dyes can have an alkyl group, a phenyl group, an enamine group or a heterocyclic substituent on the methine chain or the polymethine chain thereof. Particularly, cyanine dyes containing a carboxyl group are effective for sensitization. The merocyanine dyes can contain an acid nucleus such as a thiohydantoin nucleus, a rhodanine nucleus, an oxazolidindione nucleus, a thiazolidindione nucleus, a barbituric acid nucleus, a pyrazolone nucleus or a malonitrile nucleus in addition to the above-described basic nucleus. These acid nuclei can be substituted with an alkyl group, an alkylene group, a phenyl group, a carboxyalkyl group, a sulfoalkyl group, a hydroxyalkyl group, an alkoxyalkyl group, an alkylamino group or a heterocyclic nucleus. Particularly, merocyanine dyes having an imino group or a carboxyl group are effective for sensitization. If desired, these dyes can be used as a combination of two or more thereof. Further, they can be used together with ascorbic acid derivatives, azaindenes, cadmium salts, organic sulfonic acids or supersensitizing additives which do not absorb visible light as described in, for example, U.S. Pat. Nos. 2,933,390 and 2,937,089, etc. Effective sensitizing dyes for the heat developable light-sensitive materials of the present invention include merocyanine dyes containing a rhodanine nucleus, a thiohydantoin nucleus or a 2-thio-2,4-oxazolidindione nucleus as described in U.S. Pat. No. 3,761,279.

The amount of these dyes generally ranges from about $10^{-4}$ to about 1 mol per mol of the light-sensitive silver halide or the silver halide forming component.

The heat developable light-sensitive materials can have an antistatic layer or an electrically conductive layer. These layers can contain soluble salts such as halides or nitrates, ionic polymers as described in U.S. Pat. Nos. 2,861,056 and 3,206,312 and insoluble inorganic salts as described in U.S. Pat. No. 3,428,451. Further, the heat developable light-sensitive materials can have an evaporation-deposited metal layer. If desired, the heat developable light-sensitive materials of the present invention can contain an antihalation material or an antihalation dye. Preferred examples of such dyes are those dyes which are decolored upon heat development. For example, the dyes described in U.S. Pat. Nos. 3,768,019, 3,745,009 and 3,615,432 are preferred. Further, filter dyes or light absorbing materials as described in U.S. Pat. Nos. 3,253,921, 2,527,583 and 2,956,879 can be incorporated into the heat developable light-sensitive material or this invention.

If desired, the heat developable light-sensitive materials can contain a matting agent such as starch, titanium dioxide, zinc oxide, silica, polymer beads such as those described in U.S. Pat. Nos. 2,922,101 and 2,761,245, kaolin or clay, etc. Furthermore, they can contain an optical whitening agent such as the stilbenes, triazines, oxazoles or coumarins as described in, for example, German Patent Nos. 972,067 and 1,150,274, French Patent 1,530,244 and U.S. Pat. Nos. 2,933,390 and 3,406,070. These optical whitening agents can be used as an aqueous solution or as a dispersion.

The heat developable light-sensitive materials can additionally contain a plasticizer and a lubricant. For example, glycerin, diols, polyhydric alcohols as described in U.S. Pat. No. 2,960,404, aliphatic acids or esters as described in U.S. Pat. Nos. 2,588,765 and 3,121,060 and silicone resins described in, for example, British Patent No. 955,061 can be used as plasticizers and lubricants. Furthermore, the light-sensitive materials can contain a surface active agent, for example, saponin and alkylaryl sulfonates described in, for example, U.S. Pat. No. 2,600,831, ampholytic compounds described in, for example, U.S. Pat. No. 3,133,816 and addition products of glycidol and alkyl phenols described in, for example, British Patent No. 1,022,878.

Hardenable layers of the heat developable light-sensitive layers used in the present invention can be hardened by organic or inorganic hardening agents. These hardening agents can be used individually or as a combination of two or more thereof. Preferred hardening agents are aldehydes, blocked aldehydes, ketones, carboxylic acids, carbonic acid derivatives, sulfonic acid esters, sulfonyl halides, vinyl sulfonyl esters, active halogen compounds, epoxy compounds, aziridines, active olefins, isocyanates, carbodiimides and polymeric hardening agents such as dialdehyde starch, etc.

Further, many additives can be used to increase the density of the resulting images. For example, non-aqueous polar organic solvents such as compounds having a $$\underset{\underset{O}{\parallel}}{-C-},\ \underset{\underset{O}{\parallel}}{-S-}$$

or $-SO_2-$ group as described in U.S. Pat. No. 3,667,959, for example, tetrahydrothiophene-1,1-dioxide, 4-hydroxybutanoic acid lactone and methylsulfinyl methane are effective. Zinc, cadmium and copper acetates as described in U.S. Pat. No. 3,708,304 are also effective. Furthermore, compounds containing water of crystallization as described in U.S. Pat. No. 3,635,719, acid salts of amines and compounds which become alkaline on heating such as metal oxides or hydroxides are effective as the materials for accelerating development. It is possible to use polyalkylene glycols together with mercaptotetrazole in order to improve the sensitivity, contrast and image density as described in U.S. Pat. No. 3,666,477.

Various methods can be utilized in order to prevent the generation of heat fog of the heat developable light-sensitive materials. One method comprises using mercury compounds, as described in U.S. Pat. No. 3,589,903. Further, it is possible to form direct positive images using mercury compounds as described in U.S. Pat. No. 3,589,901. Furthermore, the mercury compounds can be used together with color forming couplers in order to form stabilized color images as described in U.S. Pat. No. 3,764,328. A second method for preventing the generation of heat fog is described in German Patent Applications (OLS) Nos. 2,326,865, 2,402,161, 2,364,630, wherein N-halo compounds such as N-halosuccinimides or N-haloacetamides are used. Other methods for preventing the generation of heat fog are described in U.S. Pat. No. 3,645,739. German Patent Application (OLS) No. 2,445,038, and Japanese Patent Applications (OPI) Nos. 89720/1973 and 125016/1974, wherein higher aliphatic acids such as lauric acid, myristic acid, palmitic acid, stearic acid or behenic acid, etc., tetrahalophthalic acid or the anhydride thereof, aryl sulfonic acids such as benzene sulfonic acid or p-toluene sulfonic acid, aryl sulfinic acid or salts thereof such as benzene sulfinic acid or p-toluene sulfinic acid, and lithium salts of higher aliphatic acids such as lithium stearate, etc., are used as acid stabilizing agents. Other effective acid stabilizing agents include salicylic acid, p-hydroxybenzoic acid, tetrabromobenzoic acid, tetrachlorobenzoic acid, p-acetamidobenzoic acid, alkyl substituted benzoic acids such as p-t-butylbenzoic acid, phthalic acid, isophthalic acid, trimellitic acid, pyromellitic acid, diphenic acid, and 5′, 5′-methylene-bis-salicyclic acid. These acid stabilizing agents not only prevent the generation of heat fog but also sometimes have the functions of preventing discoloration when exposed to white light, increaing the image density or improving the shelf life (the property that the photographic properties of the light-sensitive material possessed just after production are maintained after storage). Other compounds which are effective for preventing generation of heat fog are benzotriazole and derivatives thereof, thiouracils, for example, 2-thiouracils represented by the formula (XIII):

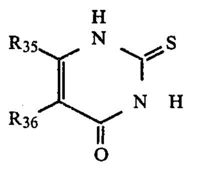

(XIII)

wherein $R_{35}$ represents a hydrogen atom; a hydroxyl group, an alkoxy group, a halogen atom, lower alkyl group of 1–4 carbon atoms, a benzyl group, an allyl group, an amino group, a nitro group or a nitroso group, and $R_{36}$ represents a hydrogen atom, a hydroxyl group, a halogen atom, an amino group, an acetamido group, an alkyl group having 1 to 22, preferably 1–10, carbon atoms or $C_6$–$C_{18}$, preferably $C_6$–$C_{12}$, an aryl group, such as a phenyl group. Also, effective prevention of the generation of heat fog or improvement in photographic properties, such as sensitization, can be achieved if chromium salts, rhodium salts, copper salts, nickel salts, cobalt salts and complex salts of rhodium, iron or cobalt are present during formation or before formation of the silver halide.

In order to prevent discoloration by light of the processed light-sensitive material (the phenomenon in which unexposed areas of the light-sensitive material after processing are gradually discolored by light when exposed to normal room illumination), it is possible to use stabilizer precursors such as azole thioethers or blocked azolethiones as described in U.S. Pat. No. 3,839,049, tetrazolyl thio compounds as described in U.S. Pat. No. 3,700,457 and light-sensitive halogen-containing organic oxidizing agents as described in U.S. Pat. No. 3,707,377.

In addition, it is possible to use light absorbing dyes as described in British Patent No. 1,261,102, for, particularly, transmission light-sensitive materials in order to improve the resolving power. Further, it is possible to use leuco dye compounds described in, for example, German Patent Application (OLS) No. 2,446,892 in order to improve the shelf life. It is also possible to increase the whiteness by blueing the elements using blue dyes such as Victoria Blue so that the color stain of dyes can be reduced, as described in Japanese Patent Application No. 22135/1974.

Further, it is possible in some cases to stabilize the processed light-sensitive materials to light or heat. Effective methods include the process described in U.S. Pat. No. 3,617,289 which comprises stabilizing the materials using a solution containing mercapto compounds and the method described in German Patent Application (OLS) No. 2,443,292 which comprises providing a laminate containing a stabilizing agent.

Further, it is possible to provide, if desired, a top-coating polymer layer on the light-sensitive layer in order to enhance the transparency of the heat developable light-sensitive layer, to increase the image density and to improve the shelf life, as described in German Patent Application (OLS) No. 2,323,452. A preferred thickness for the top coating polymer layer ranges from about 1 micron to about 20 microns. Examples of polymers suitable for the top-coat polymer layer include polyvinyl chloride, polyvinyl acetate, vinyl acetate-vinyl chloride copolymers, polystyrene, polymethyl methacrylate, methyl cellulose, ethyl cellulose, cellulose acetate butyrate, cellulose acetate, polyvinylidene chloride, cellulose propionate, cellulose acetate phthalate, polycarbonate, celluloe acetate propionate and polyvinyl pyrrolidone, etc. A top coat polymer layer containing a material such as kaolin, silica or a polysaccharide such as starch therein, as described in Belgian Patent No. 798,367 and Japanese Patent Application (OPI) No. 46316/1975 provides the heat developable light-sensitive material with the ability to be written upon with a ball-point pen or a pencil. Further, the top coat polymer layer can contain a filter dye, an ultraviolet light absorbing agent or an acid stabilizing agent such as higher aliphatic acids, etc.

The heat developable light-sensitive layers, the top-coat polymer layer, a subbing layer, a back layer and other layers used in the present invention can be coated on a support using various coating methods. Examples of such methods are a dip-coating method, an air-knife coating method, a curtain coating method and a hopper coating method. If desired, two or more layers can be coated at the same time using the methods described in U.S. Pat. No. 2,761,791 and British Patent No. 837,095.

The heat developable light-sensitive materials generally have the characteristic that the photographic properties thereof are easily deteriorated by moisture. Therefore, when the prepared light-sensitive materials are packed and sent into the trade as commodities, a drying agent, as described in German Patent Application (OLS) No. 2,422, 040, is generally packed with the materials.

The heat developable light-sensitive materials can have a subbing layer between the support and the heat developable light-sensitive layer. Examples of binders which can be used for such a subbing layer include various polymers as described hereinbefore. For example, polyvinyl butyral, polyacrylamide, cellulose acetate butyrate, cellulose acetate propionate, polymethyl methacrylate, polystyrene, polyvinyl pyrrolidone, ethyl cellulose, polyvinyl chloride, chlorinated rubber, polyisobutylene, butadiene-styrene copolymers, vinyl chloride-vinyl acetate copolymers, vinyl acetate-vinyl chloride-maleic acid terpolymers, polyvinyl alcohol, polyvinyl acetate, cellulose acetate, cellulose propionate, cellulose acetate phthalate, gelatin, gelatin derivatives and polysaccharides, etc., can be used. It is possible to improve the photographic properties such as light-discoloration or heat fog, etc., by incorporating aliphatic acids or metal salts thereof in the subbing polymer layer. Further, it is possible to prevent permeation of solvents by incorporating pigments such as clay into the subbing layer. In addition, a matting agent such as silica, kaolin, titanium dioxide or zinc oxide can be added to the subbing layers. Further, a non-electrolytic deposition layer composed of a conductive metal as described in U.S. Pat. No. 3,748,137 can be present. It is also possible to improve the moisture resistance or to prevent curling in case of a paper support by providing a hydrophobic polymer layer on the back of the support.

The heat developable light-sensitive materials are cut to appropriate sizes and are developed by heating after image exposure.

The light-sensitive materials of the invention can be preheated before exposure to light as described above (to about 80° C. to about 140° C.). Light sources suitable for image exposure are tungsten lamps, fluorescent lamps used for exposing diazotype light-sensitive materials, mercury lamps, xenon lamps, cathode ray tube (CRT) light sources and laser light sources, etc. As originals, not only line images such as drawings but also photographic images having a gradation can be used. Further, it is possible to directly photograph people and landscapes using a camera. The light-sensitive materials can be printed by direct contact of the light-sensitive material with the original, or can be printed using a reflection printing method or using an enlarged printing method. Although exposure depends upon the sensitivity of the light-sensitive materials, an exposure of about 10 luxes second is required for high speed sensitive materials and an exposure of about $10^4$ luxes second is required for low speed sensitive materials. The thus image-exposed light-sensitive materials can be developed simply by heating (e.g., to about 80° C. to about 180° C., preferably about 100° C. to about 150° C.). The heating time can be suitably, for example, about 1 second to 60 seconds. The heating time, of course, is related to the heating temperature employed. In general, a suitable heating time is about 5 seconds to about 40 seconds at 120° C., about 2 seconds to about 20 seconds at 130° C. and about 1 second to about 10 seconds at 140° C.

Various means can be used for heating. For example, the light-sensitive material can be contacted with a simple heated plate or with a heated drum or, if desired, it can be passed through a heated space. Further, the heating can be carried out by high frequency heating or by laser beams. In order to prevent a bad odor from being emitted or heating, the processing devices can be equipped with a deodorizer. It is also possible to incorporate certain perfumes so as to mask any bad odor of the light-sensitive materials which might be formed.

The preparation of the heat developable light-sensitive materials of the invention will be illustrated by reference to the following examples and is briefly explained as follows.

An organic silver salt-forming agent is reacted with a silver ion-providing agent (e.g., silver nitrate) using one of the various methods described above to form an organic silver salt. The preparation conditions are at atmospheric pressure and a temperature of about −15° C. to 80° C., preferably about 20° to 60° C. After washing the prepared organic silver salt with water or an alcohol, the salt is dispersed in a binder for an emulsion using a colloid mill, a mixer or a ball mill at normal temperature (e.g., about 15° to 25° C.). To the polymer dispersion of the silver salt, a silver halide forming agent is added to convert a part of the organic silver salt to silver halide. In this case, the reaction temperature ranges from about normal temperature to about 80° C., and the reaction time is about 1 minute up to about 48 hours. Further, a previously prepared silver halide as described above can be added, or silver halide can be simultaneously prepared along with the organic silver salt. The sensitizing procedure of the present invention is then conducted. Then, any additives such as spectral sensitizing dyes, reducing agents or toning agents are added, preferably as solutions thereof. These solutions are usually added at suitable intervals (e.g., about 5 to 20 minutes) to the system with stirring at about normal temperature to 50° C. When all additives have been added, the coating composition is then coated on a suitable support using a coating apparatus. The temperature of coating ranges from about 5° to 50° C. The drying temperature of the coated layers is about 3° to 100° C. and the coating speed is about 3 to 150 meter/min. If desired, an overcoating polymer layer, the subbing layer and the backing layer can be coated under similar conditions. If desired, these additional layers can be simultaneously coated.

A thermally developable light-sensitive layer formed from the composition of the present invention has extremely high sensitivity and exhibits low heat fog. Thus, the present invention is particularly useful.

The present invention will now be illustrated in more detail by the following non-limiting examples of preferred embodiments of the present invention.

All procedures were conducted at atmospheric pressure, all weights, percents, parts and the like are weight basis, the temperature of any processing was at room temperature (approximately 25° C.) unless otherwise indicated.

EXAMPLE 1

3.4 g of behenic acid was dissolved in 100 ml of benzene heated to 60° C., and the solution temperature maintained at 60° C. 100 ml of water was added to this solution with stirring to emulsify the same. Then, an aqueous solution (temperature: 10° C.; prepared by adding aqueous ammonia to about 80 ml of an aqueous solution at pH 9.5 containing 1.7 g of silver nitrate to form silver ammine complex salt and adding water to make the total about 100 ml) was added to the above-described emulsion. There was thus obtained fine crystals of silver behenate.

Upon leaving this reaction mixture at a temperature (25° C.) for 20 minutes, it separated into an aqueous phase and a benzene phase. The aqueous phase was first removed and the benzene phase washed through decantation by adding 400 ml of water thereto. 400 ml of methanol was then added thereto, and silver behenate collected by centrifugation. There was thus obtained 4 g of spindle-shaped silver behenate crystals about 1μ in length and about 0.05μ in width.

2.3 g (about 1/200 mol) of the thus-obtained silver behenate was dispersed in 20 ml of an ethanol solution containing 2.5 g of polyvinyl butyral by ball milling for 1 hour to prepare Polymer dispersion A. Then, to Polymer dispersion A were added, in sequence, the following ingredients to prepare a coating dispersion.

(1) N-Bromosuccinimide (2.5 wt% acetone solution)—1 ml (2) Ammonium thiosulfate (0.04 wt% aqueous solution)—2 ml (3) Merocyanine dye represented by the following general formula (0.025 wt% methyl cellosolve solution)—1 ml

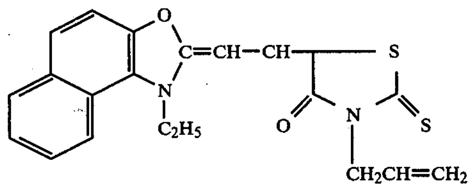

(4) 2,2'-Methylenebis(6-t-butyl-4-methylphenol) (2.5 wt% acetone solution)—3 ml (5) Phthalazone (2.5 wt% methyl cellosolve solution)—3ml In adding the above-described ingredients, ingredient (1) was first added to the polymer dispersion adjusted to 50° C. and, after heating at 50° C. for 60 minutes, 1 ml of ingredient (2) was added thereto, followed by heating at 50° C. for 20 minutes (heating in the presence of the sulfur-containing compound). Then, 1 ml of ingredient (2) was again added and the system heated at 50° C. for 40 minutes, and ingredients (3), (4) and (5) were added thereto at intervals of 5 minutes, respectively.

The thus prepared coating dispersion was coated on art paper in an amount of about 1 g silver/$m^2$ and dried to prepare a thermally developable light-sensitive material, which was referred to as Sample 1.

Separately, as a comparative sample, there was prepared a thermally developable light-sensitive material in the same manner as in Sample 1 except for not using ammonium thiosulfate. Further, there was prepared another thermally developable light-sensitive material in the same manner as in Sample 1 except for using calcium bromide in place of N-bromosuccinimide (in the same amount) and not using ammonium thiosulfate. These comparative samples were referred to as Samples 2 and 3, respectively.

Each of these three samples was image-wise exposed (exposure amount: 5,000 lux·sec) using a tungsten light through an original having a gradation, and heated at 120° C. for 30 seconds. The results of measuring the image after development are shown in Table 1. Additionally, "relative sensitivity" in Table 1 is the relative value of the reciprocal of the exposure amount necessary to provide a density of fog+0.1, taking the value of Sample 2 as 100. "Heat fog" is indicated in terms of the density (Dmin) of unexposed areas upon heating, based on the density of the support. (These terms are used in the same sense in all following Examples.)

TABLE 1

| Sample | Relative Sensitivity | Heat Fog | Maximum Density |
|---|---|---|---|
| 1 | 400 | 0.23 | 1.63 |
| 2 | 100 | 0.22 | 1.60 |
| 3 | 20 | 0.65 | 1.40 |

From the results shown in Table 1, it was recognized that, as compared with the properties of comparative Samples 2 and 3, Sample 1 using the composition of the present invention has a markedly high relative sensitivity with low heat fog. Thus, the effect of using thiosulfate is extremely remarkable.

EXAMPLE 2

1.9 g of sodium hydroxide was dissolved in 100 ml of water, and this solution was mixed with a toluene solution containing dissolved therein 12 g of lauric acid to emulsify the same (25° C.).

Then, an aqueous solution prepared by dissolving 8.5 g of silver nitrate in 50 ml of water was added thereto. Upon leaving the mixed solution for 5 minutes, it separated into a silver laurate-containing toluene phase and an aqueous phase. After removing the water phase, 200 ml of ethanol was added to the toluene phase and the system dispersed, followed by collecting silver laurate by centrifugation. There was thus obtained 12 g of spindle-shaped silver laurate crystals of about 3μ in length.

6 g (about 1/50 mol) of the thus obtained silver laurate and 12 g of polyvinyl butyral (or 12 g of ethyl cellosolve) were dispersed in 70 g of ethyl alcohol using a mixer to prepare a polymer dispersion of the silver salt (Polymer dispersion B).

Silver salt Polymer dispersion B was maintained at 50° C. and, while stirring, 0.07 g of N-bromoacetamide (silver halide-forming ingredient) was added thereto, followed by heating for 60 minutes at 50° C.

Then, 2 cc of a 0.08% by weight aqueous solution of sodium thiosulfate was added thereto and, after heating for 20 minutes at 50° (heating at presence of a sulfur-containing compound), 0.07 g of N-bromoacetamide was again added thereto, followed by heating for 60 minutes at 50° C. Then, the temperature was reduced to 30° C. and maintained at 30° C. and, while stirring, the following ingredients were added in sequence at intervals of 5 minutes, respectively, to prepare a coating dispersion.

(1) 0.025 wt% methyl cellosolve solution of a merocyanine dye (sensitizing dye) represented by the following general formula—10 ml

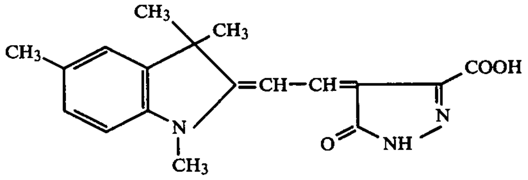

(2) 3 wt% methyl cellosolve solution of lauric acid (stabilizing agent)—35 ml 3 wt% methanol solution of phthalazone (toning agent)—50 ml (4) 20 wt% acetone solution of 2,2-bis(3,5-dimethyl-4-hydroxyphenyl)propane (reducing agent)—30 ml The thus-prepared coating dispersion was coated on art paper and on a polyethylene terephthalate film in amounts of 0.4 g and 1.5 g, respectively. Further, on the thus-formed light-sensitive layer was coated, in the former case, a dispersion of silica in a 10% ethanol solution of cellulose propionate to provide a top-coating polymer layer having a thickness of about 1.5μ (silica being contained in an amount 1/10 that of the cellulose propionate) and, in the latter case (film), a 15 wt% tetrahydrofuran solution of vinyl chloride-vinyl acetate copolymer (85:15 in weight ratio) to provide a top-coating polymer layer having a thickness of about 3μ. The thus-prepared thermally developable light-sensitive materials were referred to as Samples 4 and 4', respectively, the prime mark (') indicating the sample using the plastic film. This use of a prime mark applies in the following Examples, also.

Separately, in the same manner as with each of the above-described Samples except for not using sodium thiosulfate (the ingredient characteristic of the present invention), there were prepared thermally developable light-sensitive materials as comparative samples. These were referred to as Samples 5 and 5', respectively. As further comparative samples, there were prepared thermally developable light-sensitive materials in the same manner as Samples 4 and 4' except for not using sodium thiosulfate and using ammonium bromide in place of N-bromoacetamide in the same molar amount. These were referred to as Samples 6 and 6', respectively.

The thus-prepared six kinds of thermally developable light-sensitive materials were image-wise exposed (exposure amount: 4,000 lux·sec) through an image having gradation using tungsten light, and development-processed by heating at 120° C. for 35 seconds. After development, measurement of the resulting images provided the results tabulated in Table 2.

TABLE 2

| Support | Sample | Relative Sensitivity | Heat Fog | Maximum Density |
|---|---|---|---|---|
| | 4 | 450 | 0.24 | 1.55 |
| Art Paper | 5 | 100 | 0.24 | 1.50 |
| | 6 | 30 | 0.75 | 1.50 |
| Polyethylene | 4' | 350 | 0.06 | 2.45 |
| Terephthalate | 5' | 100 | 0.05 | 2.40 |
| Film | 6' | 25 | 0.50 | 2.42 |

From the results shown in Table 2, the effect of the thiosulfate was high regardless of the kind of supports and halogenating agent, the same as in Example 1.

EXAMPLE 3

A solution prepared by dissolving 8.6 g of capric acid in 100 ml of butyl acetate was cooled to 50° C. and, while stirring, 20 ml of a 2.5% by weight acetone solution of N-bromosuccinimide was added thereto. To this mixture was added 50 ml of an aqueous solution (pH=9.5) of silver nitrate-ammonium complex salt containing 8.5 g of silver nitrate (cooled to 5° C.) to thereby react capric acid, N-bromosuccinimide and silver ion with each other to simultaneously form both silver caprate and silver bromide. The resulting solid phase containing silver caprate and silver bromide was collected (80 g) by centrifugation and dispersed in 120 g of a 15% isopropanol solution of polyvinyl butyral using a mixer to prepare a silver salt polymer dispersion (Polymer dispersion C). To Polymer dispersion C was added 2 cc of a 0.1 wt% aqueous solution of potassium thiosulfate and, after heating for 20 minutes at 40° C. (heating in the presence of the sulfur-containing compound for sensitizing), 72 ml of a 70 wt% methyl cellosolve solution of p-phenylphenol heated to 40° C. was added to prepare a coating dispersion. This was coated on a clay-coated paper in an amount of 0.7 g silver/m$^2$ to prepare a thermally developable light-sensitive material, Sample 7.

Separately, as a comparative sample, there was prepared a thermally developable light-sensitive material, Sample 8, in the same manner as Sample 7 except for not adding potassium thiosulfate.

Following exposure and development as in Example 1, measurement of the images of Samples 7 and 8 provided the results shown in Table 3.

TABLE 3

| Sample | Relative Sensitivity | Heat Fog | Maximum Density |
|---|---|---|---|
| 7 | 350 | 0.37 | 0.98 |
| 8 | 100 | 0.35 | 0.95 |

From the results shown in Table 3, it is seen that, as compared with Sample 8 using a composition outside the present invention, Sample 7 had markedly high relative sensitivity, proving the effectiveness of the present invention.

EXAMPLE 4

6 g of benzotriazole was dissolved in 100 ml of isoamyl acetate heated to 50° C. Then, a solution, prepared by dissolving 8.5 g of silver nitrate in 100 ml of a dilute nitric acid aqueous solution (pH=2.0; 25° C.) and cooling to 3° C. was added to the above-described solution while cooling to −15° C. and stirring to produce the silver salt of benzotriazole. There was thus obtained a dispersion containing fine crystals of the silver salt of benzotriazole. The aqueous phase of the dispersion was removed and the remaining phase washed with water by decantation with 400 ml of water. Then, 400 ml of methanol was added thereto and the dispersion was subjected to centrifugation to collect the silver salt of benzotriazole. There was thus obtained 8 g of the silver salt of benzotriazole, wherein the particle size of the crystals of the silver salt of benzotriazole was about 1μ in length. 2.5 g of this silver salt of benzotriazole was added to 40 ml of a methyl ethyl ketone solution containing 4 g of ethyl cellulose and the system ball milled for 1 hour. There was thus prepared a silver salt polymer dispersion (Polymer dispersion D). To 45 g of Polymer dispersion D was added a 1 wt% acetone solution of 10 ml of N-iodosuccinimide and, after heating for 30 minutes at 50° C., 1 ml of a 0.1 wt% aqueous solution of calcium thiosulfate was added. After heating for 20 minutes at 50° C. (heating in the presence of the sulfur-containing compound for sensitizing), the following ingredients were added in sequence to prepare a coating dispersion.

(1) Methyl cellosolve solution containing 2 g of ascorbic acid monopalmitate and 2 g of ascorbic acid dipalmitate—10 ml (2) 2.5 wt% methyl cellosolve solution of N-ethyl-N'-dodecylurea—2 ml (3) 0.015 wt% methyl cellosolve solution of the sensitizing dye represented by the following formula—2 ml

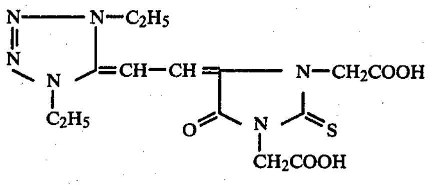

The resulting coating dispersion was coated in an amount of 1 g silver/$m^2$ on a paper surface-coated with a mixture of clay and styrene-butadiene rubber to prepare a thermally developable light-sensitive material, Sample 9.

As a comparative sample, there was prepared a thermally developable light-sensitive material, Sample 10, in the same manner as with Sample 9 except for not using calcium thiosulfate.

When each of the thus-prepared Samples 9 and 10 was subjected to image-wise exposure and development as in Example 1, the results shown in Table 4 were obtained.

TABLE 4

| Sample | Relative Sensitivity | Heat Fog | Maximum Density |
|---|---|---|---|
| 9 | 300 | 0.28 | 1.38 |
| 10 | 100 | 0.28 | 1.35 |

From the results shown in Table 4, too, the same conclusion as in the foregoing Examples was reached.

EXAMPLE 5

Polymer dispersion B as prepared in Example 2 was maintained at 50° C. and, while stirring, 15 cc of a 1.1 wt% acetone solution of N-bromoacetamide (halogen-containing compound) was added in 8 equal portions at 5 minute intervals, followed by heating for 90 minutes at 45° C. The thus-prepared silver bromide grains had about a 0.07μ grain size. To this reaction product was added 15 ml of a $4\times10^{-4}$ wt% ethanol solution of compound (32-1) hereinbefore described, the system heated for 30 minutes at 50° C. (heating in the presence of the sulfur-containing compound for sensitizing) and then cooled to room temperature.

Then, this composition was maintained at 30° C. and, while stirring, the following ingredients were added in the recited sequence at 5 minute intervals to prepare a coating dispersion.

(1) 0.025 wt% methyl cellosolve solution of merocyanine dye (sensitizing dye) represented by the following formula—10 ml

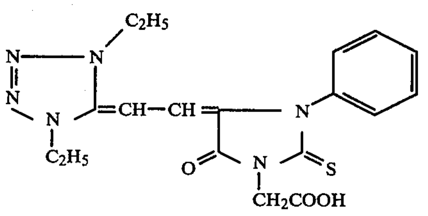

(2) 3 wt% methanol solution of phthalazone (toning agent)—50 ml (3) 20 wt% acetone solution of 2,2-bis-(3,5-dimethyl-4-hydroxyphenyl)propane (reducing agent)—30 ml (4) 5 wt% toluene solution of behenic acid (anti-fogging agent)—16 ml This coating dispersion was coated on art paper in an amount of 0.3 g silver/$m^2$ and dried to prepare a thermally developable light-sensitive material, called Sample 11.

Separately, as a comparative sample, another thermally developable light-sensitive material was prepared in the same manner as above except for not adding compound (32-1). This comparative sample was referred to as Sample 12.

The thus-prepared two samples were subjected to exposure of $10^3$ lux·sec through an optical wedge, and heat-developed at 140° C. for 10 seconds to obtain black images. The reflection density of these images was measured. The reciprocal of the exposure amount necessary to provide a reflection density of fog+0.1 was taken as the basis for sensitivity.

Table 5 shows the results of measuring relative sensitivity (taking the sensitivity of Sample 12 as 100), heat fog and Dmax.

TABLE 5

| Sample | Relative Sensitivity | Heat Fog | Dmax |
|---|---|---|---|
| 11 | 270 | 0.25 | 1.33 |
| 12 | 100 | 0.27 | 1.28 |

Separately, two identical samples were then left for 3 days at a temperature of 40° C., and then subjected to exposure and development (sensitometry) under the same conditions as above. The results are shown in Table 6.

TABLE 6

| Sample | Relative Sensitivity | Heat Fog | Dmax |
|---|---|---|---|
| 11 | 200 | 0.28 | 1.13 |
| 12 | 35 | 0.39 | 0.61 |

From the results shown in Tables 5 and 6, it can be seen that Sample 11 using the composition of the present invention showed remarkably improved sensitivity and good heat fog-preventing property and Dmax, as compared to Sample 12.

However, a particularly remarkable aspect is given in the results of retained as coated qualities after heat-processing for long times (Table 6); a great difference is seen between Sample 11 and Sample 12, i.e., Sample 12 suffered a sharp reduction in sensitivity and Dmax, whereas Sample 11 maintained both properties at high levels with only a slight reduction in sensitivity. Thus, Sample 11 was recognized to be excellent in storage capability.

EXAMPLE 6

In the same manner as in Example 5 except for adding N-bromoacetamide in a "one-shot" fashion in place of adding it in 8 portions at 5 minute intervals, there was prepared a thermally developable light-sensitive material, which was referred to as Sample 13. In this Example the grain size of the silver bromide produced was about 0.03 μ.

A comparative Sample was formed in the same manner as above in this Example except for not adding compound (32-1); this thermally developable light-sensitive material was referred to as Sample 14.

Further, in the same manner as Sample 13 except for using double the amount of compound (32-1), as compared with Sample 13, there was prepared a thermally developable light-sensitive material, which was referred to as Sample 15.

Each of the thus-prepared three samples was exposed and developed as in Example 5, and subjected to optical measurement. The results of the measurements are shown in Table 7, where the sensitivity is expressed as relative sensitivity taking the sensitivity of comparative Sample 14 as 100.

TABLE 7

| Sample | Relative Sensitivity | Heat Fog | Dmax |
|---|---|---|---|
| 13 | 185 | 0.24 | 1.39 |
| 14 (comparison) | 100 | 0.27 | 1.36 |
| 15 | 220 | 0.25 | 1.38 |

The sensitivity of the samples in this Examples is seen to be a little lower than that of the samples in the foregoing Examples. This may be attributed to the difference in the grain size of the grains produced. However, the results with Samples 13 and 14 leads to the same conclusion as in the foregoing Examples. The results with Samples 13 and 15 clearly show that the sensitizing ratio increases as the amount of the compound of the present invention increases. As to storability, the same conclusion as in the foregoing Examples was reached.

EXAMPLES 7-11

In the same manner as in Example 5 except for using the following compounds in place of compound (32-1) in Example 5, there were prepared thermally developable light-sensitive materials, which were referred to as Samples 16, 17, 18, 19 and 20, respectively.

When each of the samples was subjected to the same sensitometry measurements as in Example 5, the results shown in Table 9 were obtained. The preparation conditions and processing conditions for the samples are shown in Table 8.

TABLE 8

| | | Sulfur-Containing Compound | | Heating Conditions (for sensitizing) | |
|---|---|---|---|---|---|
| Example | Sample | No. | Amount (molar ratio) | Temperature (°C.) | Period (minutes) |
| 7 | 16 | 32-4 | 1 | 40 | 30 |
| 8 | 17 | 32-5 | 1.5 | 40 | 40 |
| 9 | 18 | 32-7 | 20 | 60 | 30 |
| 10 | 19 | 32-19 | 3 | 70 | 15 |
| 11 | 20 | 32-10 | 15 | 50 | 20 |
| 5 | 11 (control) | 32-1 | 1 | 50 | 30 |

TABLE 9

| Sample | Relative Sensitivity* | Heat Fog | Dmax |
|---|---|---|---|
| 11** | 270 | 0.25 | 1.33 |
| 12** | 100 | 0.27 | 1.28 |
| 16 | 210 | 0.27 | 1.31 |
| 17 | 260 | 0.29 | 1.28 |
| 18 | 450 | 0.30 | 1.32 |
| 19 | 220 | 0.27 | 1.33 |
| 20 | 470 | 0.30 | 1.28 |

*The sensitivity of Sample 12 was designated 100.
**Prepared as in Example 5.

From the results shown in Table 9, it is seen that high sensitization was attained with every Sample, and that the effects of the present invention are substantial. When the storability of the Samples was measured in the same manner as in Example 5, every Sample was found to be better than comparative Sample 12. Samples 17, 18 and 19 showed about the same storability as Sample 11.

EXAMPLE 12

To Polymer dispersion a prepared as in Example 1 was added 6 ml of a 1.0 wt% acetone solution of N-bromophthalazinone (halogen-containing compound), and the system heated for 90 minutes at 55° C. To this silver salt-polymer dispersion there was added 3 ml of a $5\times10^{-4}$ wt% ethanol solution of compound (32-14) as a compound having an —NR—CS— group, and the system heated at 55° C. for 30 minutes (heating in the presence of the sulfur-containing compound for sensitizing).

To the resulting polymer dispersion were added the following ingredients in the recited order at 5 minute intervals to prepare a coating dispersion.

(1) Merocyanine dye represented by the following formula (as a 0.025 wt% methyl cellosolve solution)—1 ml

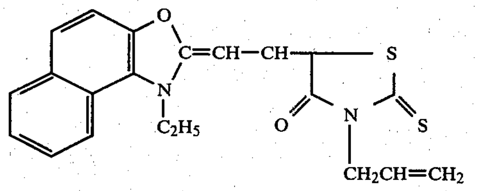

(2) 5 wt% toluene solution of behenic acid (anti-fogging agent)—5 ml (3) 2,2'-Methylenebis-(6-t-butyl-4-methylphenol) (as a 2.5 wt% acetone solution)—3 ml (4) Phthalazone (as a 2.5 wt% methyl cellosolve solution)—3 ml The thus-prepared coating dispersion was coated on a polyethylene terephthalate film in a silver amount of 1.7 $g/m^2$, and dried to prepare a thermally developable light-sensitive material, which was referred to as Sample 21.

In the same manner as described above except for omitting the addition of compound (32-14) to the silver salt polymer dispersion and omitting the heating procedure, there was prepared a thermally developable light-sensitive material, which was referred to as comparative Sample 22.

Both Samples were subjected to sensitometry in the same manner as in Example 5 except for changing the developing conditions to 120° C. and 20 seconds. As a result, the sensitivity of Sample 21 was determined to be 210, taking that of comparative Sample 22 as 100. Thus, in this Example the effects of the present invention were also clearly observed.

EXAMPLE 13

Following the procedure of Example 5 except for using 15 ml of a 1.4 wt% acetone solution of N-bromosuccinimide in place of the 15 ml of a 1.1 wt% acetone solution of N-bromoacetamide, there were prepared two thermally developable light-sensitive materials; the sample in accordance with the present invention and the comparative sample were referred to as Samples 23 and 24, respectively.

As a result of the same sensitometry as in Example 5, there were obtained the results as shown in Table 10.

TABLE 10

| Sample | Relative Sensitivity | Heat Fog | Dmax |
|---|---|---|---|
| 23 | 290 | 0.24 | 1.34 |
| 24 (comparison) | 100 | 0.27 | 1.31 |

Note: Relative sensitivity is the relative sensitivity taking the sensitivity of comparative Sample 24 as 100.

When these sample pieces were subjected to sensitometry under the same conditions as above after being stored for 3 days at 40° C., there were obtained the results shown in Table 11.

TABLE 11

| Sample | Relative Sensitivity | Heat Fog | Dmax |
|---|---|---|---|
| 23 | 210 | 0.26 | 1.18 |
| 24 | 36 | 0.39 | 0.58 |

From the results shown, it is seen that Sample 23 using the composition in accordance with the present invention showed remarkably improved sensitivity, good heat fog-preventing property and Dmax. As to its storability, Sample 23 was found to be excellent as compared to comparative Sample 24.

EXAMPLE 14

Polymer dispersion B prepared to Example 2 was maintained at 50° C. and, while stirring, 15 ml of a 1.1 wt% acetone solution of N-bromoacetamide (silver halide-forming ingredient) was added in 8 equal portions at 5 minute intervals, followed by heating for 90 minutes. To the resulting product there was added 1 g of lithium laurate and the system dispersed for 30 minutes using a homogenizer. Then, 7 ml of a $4\times10^{-4}$wt% ethanol solution of compound (32-1) was added thereto and the system heated at 50° C. for 30 minutes (heating in the presence of the sulfur-containing compound for sensitizing), whereafter the temperature was adjusted to room temperature to obtain dispersion E.

As comparative samples, there were obtained in the same manner as in the preparation of dispersion E except for: not adding lithium laurate to obtain dispersion F; not adding the compound (32-1) to obtain dispersion G; and not adding lithium laurate and the compound (32-1) to obtain dispersion H.

Then, each of dispersions E to H was maintained at 30° C. and, while stirring, the following ingredients were added to each dispersion in the recited sequence at 5 minute intervals to prepare coating dispersions.

(1) 0.025 wt% 2-methoxyethanol solution of the merocyanine dye (sensitizing dye) represented by the following formula—10 ml

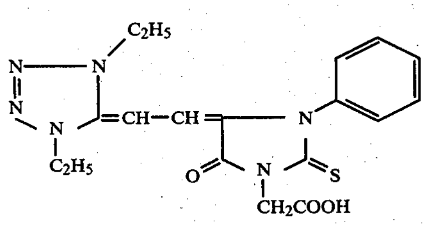

(2) 3 wt% methanol solution of phthalazinone (toning agent)—35 ml (3) 20 wt% acetone solution of the compound (reducing agent) represented by the following formula—25 ml

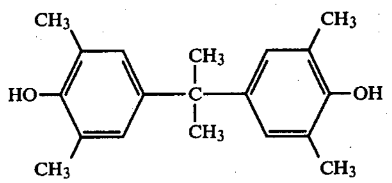

(4) 5 wt% toluene solution of behenic acid (anti-fogging agent)—16 ml

Each of the thus prepared 4 coating dispersions was coated on art paper in a silver amount of 0.3 g/m$^2$ and dried to prepare 4 thermally developable light-sensitive materials, referred to as Samples 25, 26, 27 and 28, respectively.

After being exposed through an optical wedge in an exposure amount of $10^3$ lux·sec, these samples were heat-developed at 140° C. for 10 seconds to provide black images.

Then, the reflection density of the images was measured. The reciprocal of the exposure amount necessary to provide a reflection density of fog+0.1 was selected as the basis for the sensitivity measurement; the values of relative sensitivity obtained taking the sensitivity of Sample 28 as 100 and heat fog are shown in Table 12.

TABLE 12

| Sample | Relative Sensitivity | Heat Fog |
|---|---|---|
| 25 | 670 | 0.20 |
| 26 | 203 | 0.27 |
| 27 | 98 | 0.18 |
| 28 | 100 | 0.25 |

It can be seen from the results shown in Table 12 that Sample 25 had a markedly higher sensitivity than Sample 26 and kept heat fog formation to a low level. The excellent effects when a combination of a sulfur-containing compound and a lithium carboxylate are used are apparent.

EXAMPLE 15

In the same manner as for Samples 25 to 28 in Example 14 except for: selectively adding 1.5 g of lithium palmitate in place of lithium laurate and 10 ml of a $6\times10^{-5}$ wt% ethanol solution of compound (31-a) in place of compound (32-1) (as shown in Table 13) and changing the heating conditions for sensitizing from 50° C., 30 minutes to 40° C., 60 minutes (heating in the presence of the sulfur-containing compound for sensitizing), there were obtained four thermally developable light-sensitive materials, which were referred to as Samples 29, 30, 31 and 32, respectively.

These samples were subjected to sensitometry under the same conditions as in Example 14. Relative sensitivities taking the sensitivity of light-sensitive material 32 as 100 are shown in Table 13.

TABLE 13

| Sample | Lithium Palmitate | Compound (31-a) | Relative Sensitivity | Heat Fog |
|---|---|---|---|---|
| 29 | added | added | 430 | 0.21 |
| 30 | — | added | 135 | 0.28 |
| 31 | added | — | 102 | 0.17 |
| 32 | — | — | 100 | 0.25 |

From the results shown in Table 13, it is seen that Sample 29 had a higher sensitivity and suffered less heat fog, as compared to the other Samples, which shows the excellent effects of the present invention.

EXAMPLE 16

In the same manner as for the Samples in Example 14 except for selectively using lithium stearate in place of lithium laurate and 2 ml of a $3\times10^{-3}\%$ aqueous solution of hypo in place of 7 ml of the ethanol solution of compound (32-1) (as shown in Table 14) and changing the heating conditions for sensitizing from 50° C., 30 minutes to 60° C., 20 minutes (heating in the presence of the sulfur-containing compound for sensitizing), there were prepared 4 kinds of thermally developable light-sensitive materials, which were referred to as Samples 33, 34, 35 and 36, respectively.

These Samples were subjected to sensitometry under the same conditions as in Example 14. The relative sensitivities of the Samples are shown in Table 14, taking the sensitivity of Sample 36 as 100.

TABLE 14

| Sample | Lithium Stearate | Hypo | Relative Sensitivity | Heat Fog |
|---|---|---|---|---|
| 33 | added | added | 280 | 0.22 |
| 34 | — | added | 131 | 0.30 |
| 35 | added | — | 98 | 0.16 |
| 36 | — | — | 100 | 0.26 |

From the results shown in Table 14, Sample 33 can be seen to possess markedly improved sensitivity while keeping heat fog at a low level.

EXAMPLE 17

An aqueous solution prepared by dissolving 0.8 g of cetylethyldimethylammonium bromide in 100 ml of water was mixed with 100 ml of toluene. To this was added a solution prepared by dissolving 0.425 g of silver nitrate in 10 ml of water, in order to produce silver bromide present in an emulsion. To this emulsion there was added an emulsion prepared by mixing a toluene solution (prepared by dissolving 12 g of lauric acid in 100 ml of toluene) with a solution prepared by dissolving 1.9 g of sodium hydroxide in 100 ml of water.

A solution prepared by dissolving 8.5 g of silver nitrate in 50 ml of water was then added thereto to produce silver laurate, yielding a mixture comprising silver bromide and silver laurate in intimate contact.

This mixture was collected by centrifugation, and dispersed in 200 g of an ethanol solution containing 30 g of polyvinyl butyral as a binder using a mixer to prepare a polymer dispersion of the silver salts (Polymer dispersion I).

To Polymer dispersion I was added 3 g of lithium 1,14-tetradecanedioate and the system dispersed for 30 minutes using a homogenizer. Then, 40 ml of a $1.5\times10^{-4}$ wt% ethanol solution of compound (32-1) was added thereto and the system heated for 35 minutes at 45° C. (heating in the presence of the sulfur containing compound for sensitizing). This dispersion was referred to as dispersion J.

Each of the two silver salt polymer dispersions I and J was maintained at 30° C., and the following ingredients were added in the recited sequence at 5 minute intervals to prepare coating dispersions.

(1) 0.025 wt% ethanol solution of the dye represented by the following chemical formula—24 ml

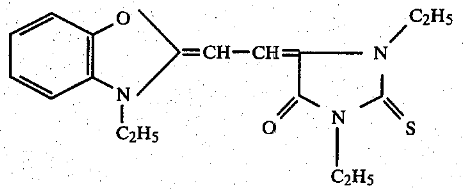

(2) 3 wt% methanol solution of phthalazinone—120 ml
(3) 20 wt% acetone solution of tetrakis-[methylene(3,5-di-t-butyl-4-hydroxyhydrocinnamato)]methane—90 ml
(4) 5 wt% toluene solution of stearic acid (anti-fogging agent)—36 ml Each of the two coating dispersions was coated on art paper in a silver amount of 0.5 g per 1 $m^2$, then dried. Further, a 10 wt% acetone solution of cellulose diacetate containing 1.5 wt% of silica fine powder about 2$\mu$ in mean particle size was coated thereon in a thickness of 1.5$\mu$ to provide a top-coating layer. These resulting two thermally developable light-sensitive materials were referred to as Samples 37 and 38, respectively.

The two Samples were subjected to sensitometry under the same conditions as in Example 14 except for heating to sensitize at 120° C. for 40 seconds (heating in the presence of the sulfur-containing compound for sensitizing).

Relative sensitivity and heat fog with each sample measured are tabulated in Table 15.

TABLE 15

| Sample | Relative Sensitivity | Heat Fog |
|---|---|---|
| 37 | 390 | 0.31 |
| 38 | 100 | 0.40 |

From the results shown in Table 15, it can be seen that Sample 37 showed remarkably improved relative sensitivity while keeping heat fog at a low level.

EXAMPLE 18

A solution prepared by dissolving 11 g of capric acid in 100 ml of butyl acetate was mixed with a solution prepared by dissolving 1.8 g of sodium hydroxide in 150 ml of water and, further, 0.25 g of ammonium bromide and 0.02 g of ammonium iodide were added thereto, followed by stirring with a homogenizer at 1500 rpm to emulsify the system. While stirring, an aqueous solution prepared by dissolving 8.5 g of silver nitrate in 50 ml of water was added thereto to yield both silver halide and silver caprate. This reaction system separated into two phases when allowed to stand. An aqueous phase, one of the two phases, was removed, and the remaining butyl acetate phase containing silver caprate and silver halide (silver caprate: ca. 1/20 mol, AgX: ca. $2.5\times10^{-3}$ mol) was dispersed in a 15 wt% isopropanol solution of polyvinyl butyral to prepare a polymer dispersion of the silver salts. This solution was referred to as dispersion K.

A dispersion was prepared in an identical fashion to dispersion K except additionally 5 g of lithium behenate was then dispersed using a homogenizer, and 30 ml of a 0.0001 wt% ethanol solution of compound (31-a) (as was used in Example 15) was added thereto and the system heated to 50° C. for 30 minutes to prepare a silver salt polymer dispersion, which was referred to as dispersion L.

To each of these two silver salt polymer dispersions was added 50 ml of a 20 wt% acetone solution of p-phenylphenol (reducing agent) at 15° C. to prepare two coating dispersions. Each coating dispersions was coated on a coated paper in a silver amount of 0.6 g/m$^2$ to prepare two thermally developable light-sensitive materials, which were referred to as Samples 39 and 40, respectively. These Samples were subjected to sensitometry in the same manner as in Example 14 except for using a 30,000 CMS exposure and conducting development at 110° C. for 30 seconds.

The relative sensitivity of Sample 40 was 240, taking the sensitivity of Sample 39 as 100. Also, Sample 40 suffered less heat fog than Sample 39.

EXAMPLE 19

To Polymer dispersion A prepared in the same manner as in Example 1 was added 1 ml of a 2.5 wt% methanol solution of ammonium bromide (silver halide-forming ingredient), and the system heated at 50° C. for 10 minutes. This dispersion was referred to as dispersion M.

An identical dispersion was prepared except that 0.15 g of lithium behenate was additionally dispersed therein using a homogenizer and, further, 9 ml of a $4\times10^{-4}$ wt% ethanol solution of compound (32-1) (as was used in Example 14) was added thereto and the system heated at 55° C. for 30 minutes (heating in the presence of the sulfur-containing compound for sensitizing). This dispersion was referred to as dispersion N. To each of these two silver salt polymer dispersions were added in the recited sequence the following ingredients at 25° C. at 5 minute intervals to prepare coating dispersions.

(1) 0.025 wt% 2-methoxyethanol solution of the sensitizing dye represented by the following chemical formula

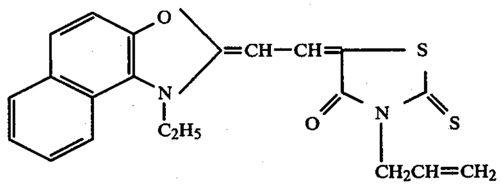

(2) 5 wt% toluene solution of behenic acid (anti-fogging agent)—5 ml (3) 25 wt% acetone solution of 2,2'-methylenebis(6-t-butyl-4-methylphenyl) (reducing agent)—3 ml (4) 3 wt% methanol solution of phthalazinone (toning agent)—5 ml Each of the thus-prepared coating dispersions was coated on a polyethylene terephthalate film in a silver amount of 1.7 g/m$^2$, and dried to prepare two thermally developable light-sensitive materials, which were referred to as Samples 41 and 42, respectively. These two Samples were subjected to sensitometry under the same conditions as in Example 14 except for conducting development at 120° C. for 20 seconds. As a result, the relative sensitivity of Sample 42 was 285, taking the sensitivity of Sample 41 as 100. Also, Sample 42 suffered less heat fog than Sample 41.

EXAMPLE 20

Polymer dispersion D prepared as in Example 4 was adjusted in temperature to 50° C. and 1.5 ml of a 6.0 wt% cadmium bromide methanol solution was added thereto, followed by heating for 15 minutes at 50° C. This dispersion was referred to as disperion O.

Then, an additional sample of dispersion O was prepared except that additionally 1 g of lithium laurate was dispersed therein using a ball mill and 7 ml of a $5\times10^4$ wt% methanol solution of compound (32-5) was added thereto, followed by heating for 30 minutes at 60° C. (heating in the presence of the sulfur-containing compound for sensitizing). This dispersion was referred to as dispersion P.

To each of dispersion O and dispersion P were added the following ingredients in the recited sequence at 10 minute intervals to prepare coating dispersion. Each of the coating dispersions were coated on a baryta paper in a silver amount of 1 g/m$^2$ to prepare thermally developable light-sensitive materials, which were referred to as Samples 43 and 44, respectively.

(1) 0.1 wt% aqueous solution of ammonium hexachlororhodium (III)—3 ml (2) 2-methoxyethanol solution containing 2 g of ascorbic acid monopalmitate and 2 g of ascorbic acid dipalmitate—10 ml (3) 2.5 wt% 2-methoxyethanol solution of N-ethyl-N'-dodecylurea (development-accelerating agent)—2 ml (4) 0.015 wt% 2-methoxyethanol solution of the sensitizing dye represented by the following chemical formula—2 ml

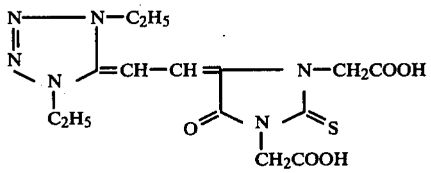

These two Samples were subjected to sensitometry under the same conditions as in Example 14 except for changing the exposure amount to 10,000 CMS and conducting development at 130° C. for 25 seconds. The relative sensitivity of Sample 44 was 210, taking the sensitivity of Sample 43 as 100. Further, Sample 44 suffered less heat fog than Sample 43.

EXAMPLE 21

100 ml of an aqueous solution containing dissolved therein 1.9 g of sodium hydroxide and 200 ml of toluene containing dissolved therein 12 g of lauric acid were mixed with each other and emulsified using homomixer. To this emulsion was added 50 ml of hydrobromic acid (0.4% aqueous solution), and the system again emulsified. To the resulting emulsion there was added 50 ml of an aqueous solution containing dissolved therein 8.5 g of silver nitrate to simultaneously form silver laurate and silver bromide. After removing the resulting aqueous phase, the remaining toluene phase (containing silver laurate and silver bromide) was dispersed in 180 g of a 15 wt% isopropanol solution of polyvinyl butyral using a homogenizer. This dispersion will be hereinafter referred to as Polymer dispersion Q.

To 80 g (about 1/60 mol silver salts) of Polymer dispersion Q was added 16 ml of a 0.5 wt% acetamide-acetone solution and, after adding thereto 20 ml of a $4\times10^{-4}$ wt% ethanol solution of the compound (32-1) and heating for 30 minutes at 50° C. (heating in the presence of the sulfur-containing compound for sensitizing), the dispersion temperature was permitted to cool to room temperature. The resulting dispersion was referred to as dispersion R.

As comparative samples, dispersions S, T and U were prepared in the same manner as dispersion R except for the differences set out in Table 16.

TABLE 16

| Dispersion | Compound (32-1) | Acetamide | Heating (50° C. 30 min) |
|---|---|---|---|
| R | present | present | conducted |
| S | present | absent | conducted |
| T | absent | present | conducted |
| U | present | present | omitted |

Dispersions R to U were maintained at 20° C. and, while stirring, the following ingredients were added in the recited sequence to each dispersion at 5 minute intervals to prepare coating dispersions.

(1) 0.025 wt% 2-methoxyethanol solution of the merocyanine dye (sensitizing dye) represented by the following formula 10 ml

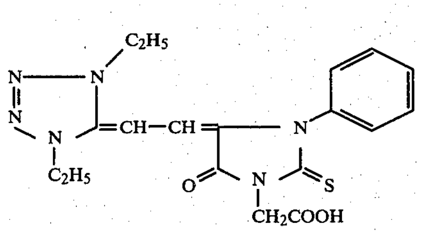

(2) 3 wt% methanol solution of phthalazinone (toning agent) 10 ml (3) 20 wt% acetone solution of the compound (reducing agent) represented by the following formula 25 ml

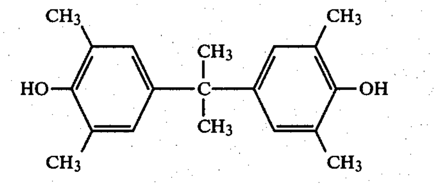

(4) 5 wt% toluene solution of abietic acid (anti-fogging agent) 16 ml

Each of the 4 thus-prepared coating dispersions was coated on art paper in an amount of 0.3 g silver/$m^2$, and dried to prepare 4 thermally developable light-sensitive materials, which were referred to as Samples 45, 46, 47 and 48, respectively.

After being subjected to exposure of $10^3$ lux·sec through an optical wedge, the samples were heat-developed at 120° C. for 20 seconds to obtain black images.

The reflection density of the images was then measured. The reciprocal of the exposure amount necessary to provide a density of fog +0.1 was selected as the basis for sensitivity. Measured values of relative sensitivity taking the sensitivity of Sample 46 as 100 and heat fog are shown in Table 17.

TABLE 17

| Sample | Relative Sensitivity* | Heat Fog | Dmax |
|---|---|---|---|
| 45 | 350 | 0.32 | 1.21 |
| 46 | 100 | 0.37 | 1.17 |
| 47 | 98 | 0.33 | 1.19 |
| 48 | 100 | 0.36 | 1.20 |

*Relative sensitivity based on that of Sample 46.

From Table 17, it is clear that Sample 45 in which a combination of the sulfur-containing compound and the compound containing a —CONH— residue was used was superior.

EXAMPLES 22-26

In the same manner as in Example 21 except for using the following compound in place of compound (32-1), there were prepared thermally developable light-sensitive materials 49 to 53.

Conditions for preparing the Samples which differed from the procedure of Example 21 are tabulated in Table 18.

TABLE 18

| Example | Sample | Sulfur-containing Compound No. | Amount Added (relative molar ratio) | Heating* Conditions Temp. (°C.) | Time (min) |
|---|---|---|---|---|---|
| 22 | 49 | 32-4 | 0.07 | 40 | 30 |
| 23 | 50 | 32-5 | 1.13 | 40 | 40 |
| 24 | 51 | 32-7 | 1.5 | 60 | 30 |
| 25 | 52 | 31-a | 1.6 | 70 | 15 |
| 26 | 53 | 32-10 | 11.2 | 50 | 20 |
| | 45 (comparison) | 32-1 | 1 | 50 | 30 |

*Heating in the presence of the sulfur-containing compound for sensitizing

Each sample was subjected to sensitometry in the same manner as in Example 21 to obtain the results shown in Table 19.

TABLE 19

| Sample | Relative Sensitivity* | Heat Fog | Dmax |
|---|---|---|---|
| 45** | 350 | 0.32 | 1.21 |
| 46** | 100 | 0.37 | 1.17 |
| 49 | 195 | 0.35 | 1.19 |
| 50 | 230 | 0.39 | 1.20 |
| 51 | 430 | 0.43 | 1.17 |
| 52 | 180 | 0.40 | 1.16 |
| 53 | 460 | 0.38 | 1.20 |

*Relative Sensitivity was based on that of Sample 46 as 100.
**Formed as in Example 21.

EXAMPLES 27-29

Samples 54 to 56 were prepared in the same manner as in Example 21 except for using butyramide, succinimide or dibenzamide in place of acetamide as shown in Table 20.

TABLE 20

| Example | Sample | Additive |
|---|---|---|
| 27 | 54 | Butyramide |
| 28 | 55 | Succinimide |
| 29 | 56 | Dibenzimide |
| | 45 (comparison) | Acetamide |

Results of sensitometry under the same conditions as in Example 21 are shown in Table 21.

TABLE 21

| Sample | Relative Sensitivity* | Heat Fog | Dmax |
|---|---|---|---|
| 45 (comparison) | 350 | 0.32 | 1.21 |
| 46 (comparison | 100 | 0.37 | 1.17 |
| 54 | 365 | 0.33 | 1.23 |
| 55 | 195 | 0.31 | 1.16 |
| 56 | 215 | 0.33 | 1.19 |

*Relative sensitivity based on that of Sample 46.

EXAMPLE 30

To Polymer dispersion I prepared as in Example 17 there was added 25 ml of a 2 wt% ethanol solution of benzamide and, after adding thereto 30 ml of a $8\times10^{-4}$ wt% acetone solution of compound (32-1) (all at 45° C.), the mixture was heated at 45° C. for 40 minutes (heating in the presence of the sulfur-containing compound for sensitizing) to provide dispersion V. To obtain a comparative sample, dispersion V" was prepared in the same manner as dispersion V except for not adding benzamide.

Each of these silver salt polymer dispersions was maintained at 30° C., and the following ingredients were added in the recited sequence at 5 minute intervals to prepare coating dispersions.

(1) 0.025 wt% methanol solution of the dye represented by the following chamical formula 24 ml

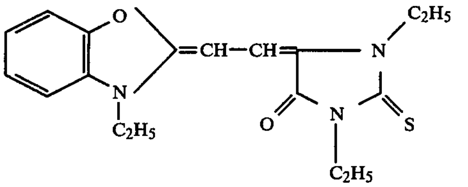

(2) 3 wt% methanol solution of phthalazinone (toning agent) 120 ml (3) 20 wt% acetone solution of tetrakis-[methylene-(3,5-di-t-butyl-4-hydroxyhydrocinnamato)]methane 90 ml (4) 0.04 wt% methanol solution of sodium benzenethiosulfonate (anti-fogging agent) 30 ml (5) 10 wt% ethanol solution of rosin (anti-fogging agent) 20 ml Each of the thus prepared coating dispersions was coated on art paper in an amount of 0.5 g silver/m², and dried. Then, a 10 wt% acetone solution of cellulose diacetate containing 1.5 wt% of silica powder of about a 2μ mean particle size was coated thereon in a thickness of 15μ to provide a topcoating layer. These thermally developable light-sensitive materials were referred to as Samples 57 and 58, respectively.

These Samples were subjected to sensitometry under the same conditions as in Example 21 except for conducting development at 140° C. for 15 seconds. Relative sensitivity and heat fog measured for each Sample are shown in Table 22.

TABLE 22

| Sample | Relative Sensitivity* | Heat Fog | Dmax |
|---|---|---|---|
| 57 | 380 | 0.30 | 0.95 |
| 58 | 100 | 0.32 | 0.95 |

*Relative sensitivity based on that of Sample 58 taken as 100.

From the results shown in Table 22, it is seen that Sample 57 showed markedly improved relative sensitivity with controlled heat fog at a low level.

EXAMPLE 31

To Polymer dispersion A prepared as in Example 1 there was added 1 ml of a 2.5 wt% methanol solution of ammonium bromide (silver halide-forming ingredient) and the system heated at 50° C. for 10 minutes. This dispersion was referred to as dispersion W.

To this dispersion W was added 3 ml of a 2 wt% ethanol solution of caprolactam and, after adding 6 ml of a $8\times10^{-4}$ wt% acetone solution of compound (32-1), the resulting dispersion was heated at 55° C. for 30 minutes (heating in the presence of the sulfur-containing compound for sensitizing). Thid dispersion was referred to as dispersion X. Further, as a comparative sample, dispersion Y was prepared in the same manner as dispersion X for not adding caprolactam. To each of the thus prepared silver salt polymer dispersion the following ingredients were added at 25° C. at 5 minute intervals in the recited sequence to prepare coating dispersions.

(1) 0.025 wt% methyl cellosolve solution of the sensitizing dye represented by the following chemical formula 1 ml

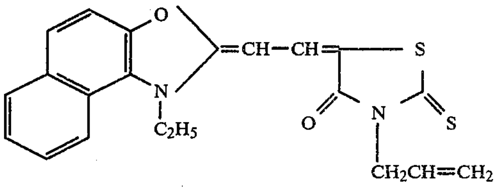

(2) 5 wt% toluene solution of behenic acid (anti-fogging agent) 5 ml (3) 0.2 wt% methanol solution of sodium benzenethiosulfonate 1 ml (4) 25 wt% acetone solution of 2,2'-methylenebis(6-t-butyl-4-methylphenol) (reducing agent) 3 ml (5) 3 wt% methanol solution of phthalazinone toning agent) 5 ml Each of the thus prepared coating dispersions was coated on a polyethylene terephthalate film in an amount of 1.7 g silver/m² and dried to prepare thermally developable light-sensitive materials, which were referred to as Samples 59 and 60, respectively. These Samples were subjected to sensitometry under the same conditions as in Example 21 except for conducting development at 120° C. for 15 seconds. The results are shown in Table 23.

TABLE 23

| Sample | Relative Sensitivity* | Heat Fog** | Dmax** |
|---|---|---|---|
| 59 | 320 | 0.21 | 2.52 |
| 60 | 100 | 0.21 | 2.50 |

*Relative sensitivity taking the sensitivity of Sample 60 as 100.
**Transmission density From Table 23, it is seen that Sample 59 is better than Sample 60.

EXAMPLE 32

100 ml of an aqueous solution containing dissolved therein 1.9 g of sodium hydroxide and 200 ml of a toluene solution containing dissolved therein 12 g of lauric acid were mixed with each other and emulsified using a homogenizer. To this emulsion was added 50 ml of an aqueous solution containing dissolved therein 8.5 g of silver nitrate to form silver laurate. After removing the resulting aqueous phase, the remaining toluene phase (containing silver laurate) was dispersed in 180 g of a 1.5 wt% isopropanol solution of polyvinyl butyral using a homogenizer to form a silver laurate polymer dispersion. To 80 g (containing about 1/60 mol silver salt) of this silver laurate polymer dispersion was added 4 ml of a 1.1 wt% N-bromoacetamide acetone solution and the system heated at 50° C. for 60 minutes. Then, after adding thereto 20 ml of $H_2O$, the solution was subjected to centrifugation at 3,000 rpm for 30 minutes to collect a precipitate, which was then dispersed in 60 g of a 15 wt% isopropanol solution of polyvinyl butyral using a homogenizer to form Polymer dispersion Z. Then, 20 ml of a 0.5 wt% acetamide acetone solution was added thereto and, after adding thereto 5 ml of a $4\times10^{-4}$ wt% acetone solution of compound (32-1) and heating for 30 minutes at 50° C. (heating in the presence of the sulfur-containing compound for sensitizing), the solution temperature was restored to room temperature. The resulting dispersion was referred to as dispersion AA.

As comparative samples, dispersions AB to AD were prepared in the same manner as dispersion Z except for the differences given in Table 24.

TABLE 24

| Dispersion | Compound (32-1) | Acetamide | Heating (50° C., 30 min) |
|---|---|---|---|
| AA | present | present | conducted |
| AB | absent | absent | conducted |
| AC | absent | present | conducted |
| AD | present | present | omitted |

Dispersions AA to AD were then maintained at 20° C. and, while stirring, the following ingredients were added in the recited sequence to each dispersion at 5 minute intervals to prepare coating dispersions.

(1) 0.025 wt% 2-methoxyethanol solution of a merocyanine dye (sensitizing dye) represented by the following formula 10 ml

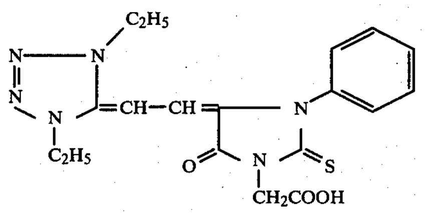

(2) 3 wt% methanol solution of phthalazinone (toning agent) 50 ml (3) 20 wt% acetone solution of a compound (reducing agent) represented by the following formula 25 ml

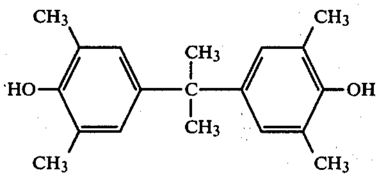

(4) 5 wt% toluene solution of abietic acid (anti-fogging agent) 16 ml (5) 0.02 wt% methanol solution of sodium benzenethiosulfonate 25 ml Each of the 4 thus prepared coating dispersion was coated on art paper in an amount of 0.3 g silver/$m^2$, and dried to prepare 4 thermally developable light-sensitive materials, which were referred to sa Samples 61, 62, 63 and 64, respectively.

After being subjected to an exposure of $10^3$ lux·sec through an optical wedge, these samples were heat-developed at 140° C. for 8 seconds to obtain black images.

The reflection density of the resulting images was then measured. The reciprocal of the exposure amount necessary to provide a density of fog +0.1 was selected as the basis for the sensitivity measurements. The measured values of relative sensitivity taking the sensitivity of Sample 62 as 100 and heat fog are shown in Table 25.

TABLE 25

| Sample | Relative Sensitivity* | Heat Fog | Dmax |
|---|---|---|---|
| 61 | 550 | 0.26 | 1.35 |
| 62 | 100 | 0.23 | 1.30 |
| 63 | 102 | 0.22 | 1.26 |
| 64 | 100 | 0.24 | 1.29 |

*Relative sensitivity based on Sample 62 as 100.

From Table 25, it is clear that Sample 61 is superior to the other Samples.

EXAMPLE 33

To 80 g of the silver laurate polymer dispersion described in Example 32 (containing about 1/60 mol silver salt) was added 4 ml of a 1.4 wt% N-bromosuccinimide acetone solution and the system heated at 45° C. for 60 minutes. Then, 25 ml of a 0.5 wt% acetamide acetone solution and 8 ml of a $4\times10^{-4}$ wt% acetone solution of compound (32-1) were added thereto and the system heated at 55° C. for 20 minutes (heating in the presence of the sulfur-containing compound for sensitizing), whereafter the temperature was restored to room temperature. Then, after adding thereto 20 ml of $H_2O$, the mixture was subjected to centrifugation at 3,000 rpm for 40 minutes to collect a precipitate, which was dispersed in 60 g of a 15 wt% polyvinyl butyral isopropanol solution. This dispersion was referred to as dispersion AE.

For comparison, dispersions AF, AG and AH were prepared in the same manner as dispersion AE except for the differences given in Table 26.

TABLE 26

| Dispersion | Compound (32-1) | Acetamide | Heating (55° C., 20 min) |
|---|---|---|---|
| AE | present | present | conducted |
| AF | absent | absent | conducted |
| AG | absent | present | conducted |
| AH | present | present | omitted |

The dispersions AE to AH were then maintained at 20° C. and, while stirring, the same ingredients as in Example 32 were added to prepare coating dispersions.

The thus prepared 4 coating dispersions were coated under the same conditions as in Example 32 to prepare 4 thermally developable light-sensitive materials. These samples were subjected to sensitometry under the same conditions as in Example 32. The results are shown in Table 27.

TABLE 27

| Sample | Relative Sensitivity* | Heat Fog | Dmax |
|---|---|---|---|
| 65 | 505 | 0.13 | 1.34 |
| 66 | 100 | 0.14 | 1.31 |
| 67 | 98 | 0.14 | 1.30 |
| 68 | 101 | 0.15 | 1.28 |

*Taking Sample 66 as 100.

Table 27 clearly shows the heating step of the present invention.

EXAMPLES 34-38

In the same manner as in Example 33 except for using the following compounds in place of compound (32-1) as was used in Example 33, there were prepared thermally developable light-sensitive materials 69 to 73. The amount of each compound added is given as a comparative value taking the amount of compound (32-1) in dispersion AF prepared in Example 33 as 1. The conditions for preparing the samples are given in Table 28.

TABLE 28

| Example | Sample | Sulfur-containing Compound No. | Amount Added (relative molar ratio) | Heating Condition* Temp. (°C.) | Time (min) |
|---|---|---|---|---|---|
| 34 | 69 | 32-4 | 0.8 | 50 | 25 |
| 35 | 70 | 32-5 | 1.5 | 45 | 35 |
| 36 | 71 | 32-7 | 0.5 | 60 | 30 |
| 37 | 72 | 31-a | 2.3 | 45 | 25 |
| 38 | 73 | 32-10 | 5.5 | 60 | 10 |
| | 61 (comparison) | 32-1 | 1 | 55 | 20 |

*Heating in the presence of the sulfur-containing compound for sensitizing

When each sample was subjected to sensitometry in the same manner as in Example 32, the results shown in Table 29 were obtained.

TABLE 29

| Sample | Relative Sensitivity* | Heat Fog | Dmax |
|---|---|---|---|
| 65 (comparison) | 505 | 0.13 | 1.34 |
| 66 (comparison) | 100 | 0.14 | 1.31 |
| 69 | 380 | 0.13 | 1.32 |
| 70 | 495 | 0.20 | 1.31 |
| 71 | 220 | 0.13 | 1.35 |
| 72 | 180 | 0.31 | 1.31 |
| 73 | 630 | 0.29 | 1.38 |

*Relative sensitivity taking the sensitivity of Sample 66 as 100

EXAMPLE 39-42

Samples 74 to 77 were prepared in the same manner as in Example 33 except for using butyramide, succinamide, dibenzamide or caprolactam in place of acetamide in the same molar amount as that of acetamide.

TABLE 30

| Example | Sample | Additive |
|---|---|---|
| 39 | 74 | Butyramide |
| 40 | 75 | Succinimide |
| 41 | 76 | Dibenzamide |
| 42 | 77 | Caprolactam |

The results obtained by sensitometry under the same conditions as in Example 32 are shown in Table 31.

TABLE 31

| Sample | Relative Sensitivity* | Heat Fog | Dmax |
|---|---|---|---|
| 65 (comparison) | 505 | 0.13 | 1.34 |
| 66 (comparison) | 100 | 0.14 | 1.31 |
| 74 | 520 | 0.12 | 1.32 |
| 75 | 260 | 0.15 | 1.30 |
| 76 | 410 | 0.15 | 1.33 |
| 77 | 330 | 0.14 | 1.31 |

*Relative sensitivity based on Sample 66 as 100.

EXAMPLE 43

To Polymer dispersion A prepared as in Example 1 there was added 3 ml of a 1.0 wt% acetone solution of N-bromophthalazinone (halogen-containing compound) and the system heated at 65° C. for 20 minutes.

To the resulting polymer dispersion were added 3 ml of a $5\times10^{-4}$ wt% acetone solution of compound (32-14) and 100 ml of a 2% acetone solution of acetamide and the system heated at 50° C. for 40 minutes (heating in the presence of the sulfur-containing compound for sensitizing). This dispersion was referred to as dispersion AI.

For the purpose of comparison, dispersion AJ was prepared in the same manner as dispersion AI except for not adding acetamide and compound (32-14). Also, dispersion AK was prepared in the same manner as dispersion AI except for not adding acetamide. To these dispersions were added the following ingredients at 5 minute intervals to prepare coating dispersions.

(1) Merocyanine dye represented by the following formula: (0.025 wt% 2-methoxyethanol solution)—1 ml

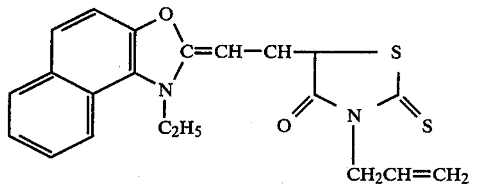

(2) 5 wt% toluene solution of behenic acid (anti-fogging agent)—5 ml (3) 1 wt% methanol solution of mercury acetate (anti-fogging agent)—2 ml (4) 2,2'-methylenebis(6-t-butyl-4-methylphenol) (2.5 wt% acetone solution)—3 ml (5) Phthalazone (2.5 wt% 2-methoxyethanol solution)—3 ml The thus prepared coating dispersions were coated on a polyethylene terephthalate film in a silver amount of 1.7 g/m$^2$ and dried to prepare thermally developable light-sensitive materials. These were referred to as Samples 78, 79 and 80, respectively.

These samples were subjected to sensitometry in the same manner as in Example 32 except for conducting development at 120° C. for 20 seconds. As a result, the sensitivity of Sample 78 was 410, taking that of Sample 79 as 100, and the sensitivity of Sample 80 was 195. Thus, in this Example Sample 78, the Sample in accordance with the present invention, was most excellent.

EXAMPLE 44

To Polymer dispersion Z prepared as in Example 32, 1 ml of a 3 wt% hydrogen peroxide aqueous solution was added and, after heating at 50° C. for 10 minutes, 10 ml of a $4\times10^{-4}$ wt% acetone solution of compound (32-1) was added thereto. The mixture was then heated at 50° C. for 30 minutes (heating in the presence of the sulfur-containing compound for sensitizing), and the temperature then restored to room temperature. The resulting dispersion was referred to as dispersion AL.

As comparative samples, dispersion AM and AN were prepared in the same manner as dispersion AL except for the differences given in Table 32.

TABLE 32

| Dispersion | Compound (32-1) | aq. $H_2O_2$ | Acetamide | Heating (50° C., 30 min) |
|---|---|---|---|---|
| AL | present | present | absent | conducted |
| AM | absent | absent | absent | omitted |
| AN | present | present | present | conducted |

*In the case of using acetamide, 20 m of a 0.5 wt % by weight acetone solution of acetamide was added together with compound (32-1).

Then, dispersions AL to AN were maintained at 20° C. and, while stirring, the following ingredients were added in the recited sequence to each dispersion at 5 minute intervals to prepare coating dispersions.

(1) 0.025 wt% 2-methoxyethanol solution of a merocyanine dye (sensitizing dye) represented by the following formula—10 ml

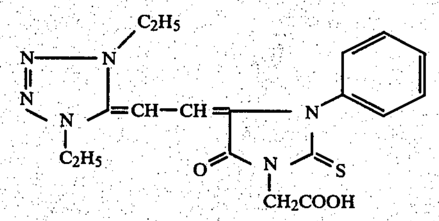

(2) 3 wt% methanol solution of phthalazinone (toning agent)—50 ml (3) 20 wt% acetone solution of a compound (reducing agent) represented by the following formula—25 ml

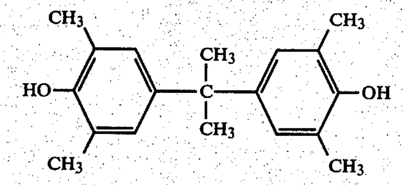

(4) 5 wt% toluene solution of abietic acid (anti-fogging agent)—16 ml (5) 0.02 wt% methanol solution of sodium benzenethiosulfonate—25 ml Each of the three thus prepared coating dispersion was coated on art paper in an amount of 0.3 g silver/$m^2$, and dried to prepare three thermally developable light-sensitive materials, which were referred to as Samples 81, 82 and 83, respectively.

After being subjected to an exposure of $10^3$ lux·sec through an optical wedge, these samples were heat-developed at 140° C. for 12 seconds to obtain black images.

The reflection density of the images was then measured. The reciprocal of the exposure amount necessary to provide a density of fog+0.1 was selected as the basis for sensitivity. The values of the relative sensitivity, taking the sensitivity of Sample 82 as 100, and heat fog are shown in Table 33.

TABLE 33

| Sample | Relative Sensitivity* | Heat Fog | Dmax |
|---|---|---|---|
| 81 | 145 | 0.28 | 1.32 |
| 82 | 100 | 0.35 | 1.31 |
| 83 | 510 | 0.26 | 1.30 |

*Relative sensitivity based on Sample 82 as 100.

From Table 33, it is clear that the present invention provides superior results.

EXAMPLE 45

To 80 g (about 1/60 mol silver salt) of Polymer dispersion Q prepared in Example 21 there was added 2 cc of a 3 wt% hydrogen peroxide aqueous solution and, after heating at 55° C. for 5 minutes, 35 ml of a $4\times10^{-4}$ wt% ethanol solution of compound (32-1) was added thereto. After heating at 60° C. for 25 minutes (heating in the presence of the sulfur-containing compound for sensitizing), the temperature of the system was then restored to a room temperature.

After adding thereto 20 ml of $H_2O$, the solution was subjected to centrifugation at 3,000 rpm for 40 minutes to collect a precipitate, which was then dispersed in 60 g of a 15 wt% isopropanol solution of polyvinyl butyral using a homogenizer. This was referred to as dispersion AO.

Dispersions AP and AQ were prepared in the same manner as dispersion AO except for the differences given in Table 34.

TABLE 34

| Dispersioh | Compound (32-1) | $H_2O_2$ | Acetamide | Heating (60° C., 25 min) |
|---|---|---|---|---|
| AO | present | present | absent | conducted |
| AP | absent | absent | absent | omitted |
| AQ | present | present | present | conducted |

Coating dispersions were prepared and coated as in Example 44 to prepare Samples, and the Samples were subjected to sensitometry under the same conditions as in Example 44 except for developing by heating at 130° C. for 15 seconds. The results are shown in Table 35.

TABLE 35

| Sample | Relative Sensitivity | Heat Fog | Dmax |
|---|---|---|---|
| 84 | 140 | 0.38 | 1.35 |
| 85 | 100 | 0.40 | 1.32 |
| 86 | 440 | 0.35 | 1.36 |

From Table 35, it is clear that the process of the present invention is excellent.

EXAMPLES 46 & 47

In the same manner as for Samples 84 or 85 in Example 45, except for the differences given in Table 36 and using the following compounds in place of compound (32-1), there were prepared thermally developable light-sensitive materials 87 and 88. The amount of each compound added is given as a comparative value, taking the amount of compound (32-1) in solution AO as 1.

TABLE 36

| Example | Sample | Sulfur-containing Compound No. | Amount Added (molar ratio) | Heating Condition* | $H_2O_2$ |
|---|---|---|---|---|---|
| 46 | 87 | Compound (32-7) | 0.5 | 50° C., 35min | present |
| 47 | 88 | Compound (31-a) | 2.0 | 45° C., 25min | present |

*Heating time after the addition of sulfur-containing compound to sensitize.

When each sample was subjected to sensitometry in the same manner as in Example 44, the results shown in Table 37 were obtained.

TABLE 37

| Sample | Relative Sensitivity* | Heat Fog | Dmax |
|---|---|---|---|
| 84 (comparison) | 140 | 0.38 | 1.35 |
| 85 (comparison) | 100 | 0.40 | 1.32 |
| 87 | 121 | 0.36 | 1.33 |
| 88 | 132 | 0.45 | 1.33 |

*Relative sensitivity taking the sensitivity of Sample 85 as 100.

From the above results, it is seen that the process of the present invention is excellent.

EXAMPLES 48-51

In the same manner as with Sample 85 in Example 45 except for using the following compound in place of $H_2O_2$, there were prepared thermally developable light-sensitive materials 89 to 92. The amount of each compound is given as a relative value taking the amount of $H_2O_2$ in dispersion AO as 1.

TABLE 38

| Example | Sample | Oxidizing Agent | Amount Added (molar ratio) |
|---|---|---|---|
| 48 | 89 | dibenzoly peroxide* | 2 |
| 49 | 90 | ammonium peroxodisulfate | 3 |
| 50 | 91 | peracetic acid | 1 |
| 51 | 92 | N-bromosuccinimide** | 3 |

*Using benzene as a solvent
**Using acetone as a solvent

The results obtained by sensitometry under the same conditions as in Example 44 are shown in Table 39.

TABLE 39

| Sample | Relative Sensitivity* | Heat Fog | Dmax |
|---|---|---|---|
| 84 (comparison) | 140 | 0.38 | 1.35 |
| 85 (comparison) | 100 | 0.40 | 1.32 |
| 89 | 139 | 0.43 | 1.34 |
| 90 | 140 | 0.44 | 1.35 |
| 91 | 130 | 0.29 | 1.08 |
| 92 | 290 | 0.39 | 1.34 |

*Relative sensitivity based on Sample 85 as 100.

From the above results, it is seen that the process of the present invention is excellent.

EXAMPLE 52

To Polymer dispersion A prepared as in Example 1 there was added 2 ml of a 1 wt% hydrobromic acid methanol solution, and the system heated at 50° C. for 30 minutes.

To this resulting polymer dispersion there was added 2 ml of a 1 wt% aqueous hydrogen peroxide solution and, after heating at 50° C. for 10 minutes, 5 ml of a $5\times10^{-4}$ wt% acetone solution of compound (32-14) was added thereto, followed by heating at 50° C. for 30 minutes (heating in the presence of the sulfur-containing compound for sensitizing). This dispersion was referred to as dispersion AR.

For the purpose of comparison, dispersion AS was prepared in the same manner as dispersion AR except for not adding the hydrogen peroxide aqueous solution and compound (32-14). To these polymer dispersions there were added in the recited sequence the following ingredients at 20° C. at 5 minute intervals to prepare a coating dispersion.

(1) Merocyanine dye represented by the following formula (0.025 wt% 2-methoxyethanol solution)—1 ml

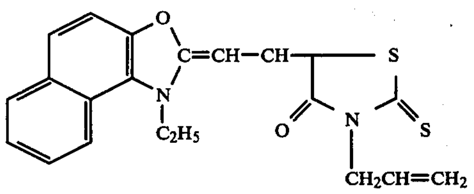

(2) 5 wt% toluene solution of behenic acid (anti-fogging agent)—5 ml (3) 1 wt% methanol solution of mercury acetate (anti-fogging agent)—2 ml (4) 2,2′-methylenebis(6-t-butyl-4-methylphenol) (2.5 acetone solution)—3 ml (5) Phthalazone (2.5 wt% 2-methoxyethanol solution)—3 ml The thus prepared coating dispersion were coated on a polyethylene terephthalate film in a silver amount of 1.7 g/m² and dried to prepare thermally developable light-sensitive materials. These were referred to as Samples 93 and 94, respectively.

These samples were subjected to sensitometry in the same manner as in Example 44 except for conducting development at 140° C. for 8 seconds. The results are shown in Table 40.

TABLE 40

| Sample | Relative Sensitivity* | Heat Fog | Dmax |
|---|---|---|---|
| 93 | 138 | 0.25 | 2.35 |
| 94 | 100 | 0.25 | 2.30 |

*Taking Sample 94 as 100.

The effects of the present invention are also clearly observed in this Example.

EXAMPLE 53

In the same manner as for dispersion AL in Example 44 except for adding the hydrogen peroxide aqueous solution and compound (32-1) simultaneously and, after heating at 50° C. for 30 minutes (heating in the presence of the sulfur-containing compound for sensitizing), restoring the temperature to room temperature in place of heating at 50° C. for 10 minutes after adding 1 ml of a 3 wt% hydrogen peroxide aqueous solution, adding 10 ml of a $4\times10^{-4}$ wt% acetone solution of compound (32-1) and, after heating at 50° C. for 30 minutes, restoring the temperature to room temperature, there was prepared dispersion AT. After preparing a coating dispersion in the same manner as in Example 44, the dispersion was coated on art paper to prepare a thermally developable light-sensitive material. This was referred to as Sample 95.

The results obtained by sensitometry under the same conditions as in Example 44 are shown, in the following table.

TABLE 41

| Sample | Relative Sensitivity* | Heat Fog | Dmax |
|---|---|---|---|
| 82 (comparison) | 100 | 0.35 | 1.31 |
| 95 | 125 | 0.34 | 1.30 |

*Relative sensitivity based on Sample 82 as 100.

This Example also clearly demonstrated the superior effects of the present invention.

While the invention has been described in detail and with reference to specific embodiments thereof, it will be apparent to one skilled in the art that various changes and modifications can be made therein without departing from the spirit and scope thereof.

What is claimed is:

1. In a process for producing an unexposed, coatable thermally developable light-sensitive composition of improved sensitivity which process comprises heating a composition containing an organic silver salt and a light-sensitive silver halide and after the completion of said heating adding a reducing agent, the improvement wherein a sulfur-containing compound is added to the organic silver salt and the light-sensitive silver halide and the sulfur-containing compound, organic silver salt and light-sensitive silver halide are heated at about 30° C. to about 70° C. for about 5 minutes to about 300 minutes, at which temperature said improved sensitivity is obtained, which sulfur-containing compound comprises at least one labile sulfur atom and forms silver sulfide upon reaction with the organic silver salt or the silver halide, wherein said sulfur-containing compound is represented by one of the following general formulae:

$M^{I}S_2O_3$ or $M^{II}S_2O_3$ wherein $MI^{I}$ represents a monovalent cation and $M^{II}$ represents a divalent cation;

$R_2—CS—NR_1R_3$ wherein $R_1$ represents a hydrogen atom, an alkyl group, a carboxy- or aryl-substituted alkyl group, an alkenyl group, an aryl group, an alkyl-, carboxy- or carboxyalkyl substituted aryl group or an acyl group wherein said group or $R_1$ contains 12 or less carbon atoms; $R_2$ is a group selected from the class consisting of those represented by the following general formulae:

$R_4R_5N—$, $R_6R_7N—CS—NR_8—NR_9—$,

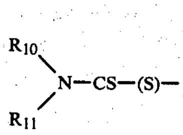 and $R_{12}R_{13}C=N_{14}—$ wherein $R_4$ to $R_{14}$ are the same as defined for $R_1$ and n represents an integer of 1 to 3; and $R_3$ is the same as defined for $R_1$;

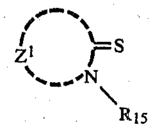

wherein $Z^1$ represents the atoms necessary to form a 5- or 6- membered heterocyclic ring, which heterocyclic ring may fuse with an aromatic ring, and which heterocyclic ring can be substituted with a substituent having 24 or less carbon atoms selected from the group consisting of an alkyl group, an aryl-substituted alkyl group, a carboxy-substituted alkyl group, an alkylidene group, an alkyl-substituted alkylidene group, a carboxy-substituted alkylidene group, a carboxyalkyl-substituted alkylidene group, an aryl group, an alkyl-substituted aryl group, a carboxy-substituted aryl group, a carboxyalkyl-substituted aryl group, an arylidene group, an alkyl-substituted arylidene group, a carboxy-substituted arylidene group and a carboxyalkyl-substituted arylidene group, and $R_{15}$ represents a hydrogen atom, an alkyl group, a carboxy- or aryl-substituted alkyl group, an alkenyl group, an aryl group or an alkyl-, carboxy- or carboxyalkyl-substituted aryl group wherein said group for $R_{15}$ contains 12 or less carbon atoms; and

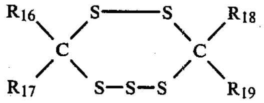

wherein $R_{16}$, $R_{17}$, $R_{18}$ and $R_{19}$ each represents a member selected from the group consisting of a hydrogen atom, an alkyl group having 12 or less carbon atoms or an aryl- or carboxy-substituted alkyl group having 12 or less carbon atoms.

2. The process of claim 1, wherein said heating is further in the presence of a lithium salt of a carboxylic acid having 10 or more carbon atoms.

3. The process of claim 1, wherein said heating is further in the presence of a compound comprising a —CONH— residue.

4. The process of claim 1, wherein said heating is conducted after first heating the composition containing the organic silver salt and the light-sensitive silver halide in the presence of an oxidizing agent which is zone gas, a peroxide or a peracid.

5. The process of claim 1, wherein said organic silver salt is a silver salt of an organic compound containing an amino group.

6. The process of claim 1, wherein said organic silver salt is a silver salt of an organic compound containing a mercapto group.

7. The process of claim 1, wherein said organic silver salt is a silver salt of an organic compound containing a thione group.

8. The process of claim 1, wherein said organic silver salt is a silver salt of an organic compound containing a carboxylic group.

9. The process of claim 1, wherein said organic silver salt has a particle size of about 0.01 micron to about 10 microns.

10. The process of claim 1, wherein said organic silver salt and said light-sensitive halide are in initimate contact.

11. The process of claim 1, wherein said light-sensitive silver halide is formed by an in situ reaction of a halogen-containing compound capable of forming a silver halide upon reaction with said organic silver salt, thereby yielding said light-sensitive silver halide.

12. The process of claim 11, wherein said compound capable of forming silver halide is an inorganic halide other than silver halide.

13. The process of claim 11, wherein said compound capable of forming a silver halide is a halogen-containing metal complex.

14. The process of claim 11, wherein said compound capable of forming a silver halide is an onium halide.

15. The process of claim 11, wherein said compound capable of forming a silver halide is a halogenated hydrocarbon.

16. The process of claim 11, wherein said compound capable of forming a silver halide is an N-halogen compound.

17. The process of claim 1, wherein said light-sensitive silver halide is present in an amount of from about 0.001 to about 0.05 mol per mol of the organic silver salt.

18. The process of claim 1, wherein said sulfur-containing compound is selected from the group consisting of $Na_2S_2O_3$, $K_2S_2O_3$, $(NH_4)_2S_2O_3$, $CaS_2O_3$, $SrS_2O_3$, $FeS_2O_3$, $BaS_2O_3$ and $Tl_2S_2O_3$.

19. The process of claim 1, wherein said sulfur-containing compound is present in an amount of from about $10^{-8}$ mol to about $10^{-2}$ mol per mol of the organic silver salt.

20. The process of claim 1, wherein said sulfur-containing compound is present in an amount of from about $10^{-7}$ mol to about $10^{-3}$ mol per mol of the organic silver salt.

21. The process of claim 1, wherein said heating is for a period of from 10 minutes to 180 minutes.

22. The process of claim 2, wherein said lithium salt of a carboxylic acid is represented by the formula RCOOLi, wherein R represents a substituent containing 9 or more carbon atoms.

23. The process of claim 22, wherein R contains 11-31 carbon atoms.

24. The process of claim 22, wherein said lithium salt of a carboxylic acid is selected from the group consisting of lithium laurate, lithium palmitate, lithium myristate, lithium stearate, lithium behenate, lithium 1,14-tetradecanedioate, lithium 1,16-hexadecanedioate, lithium 1,12-dodecanedioate, lithium erucate, lithium brassidate, lithium docosenylsuccinate, lithium octadecanylsuccinate, lithium docosenylglutarate, lithium docosenyladipate, lithium tetradecanyladipate and lithium tetradecanylheptanedioate.

25. The process of claim 2, wherein said lithium salt of a carboxylic acid is present in an amount of from about 0.001 mol to about 2 moles per mol of the organic silver salt.

26. The process of claim 3, wherein said compound containing a —CONH— residue is selected from the compounds of the general formulae:

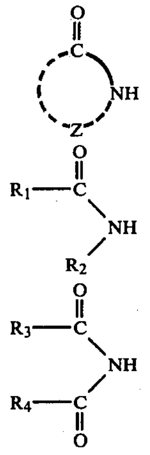

wherein Z represents the atoms necessary to form a 4- to 8-membered ring, $R_1$ and $R_2$, which may be the same or different, each represents a hydrogen atom, an alkyl group, an aryl group or an alkoxy group, and $R_3$ and $R_4$, which may be the same or different, each represents an alkyl group or an aryl group.

27. The process of claim 3, wherein said compound containing a —CONH— residue is selected from the group consisting of formamide, N-ethylformamide, N-allylformamide, acetamide, acetomethylamide, acetoethylamide, propylamide, butyramide, N-methylbutyramide, hexylamide, dodecylamide, N-methyldodecylamide, tetradecanylamide, formanilide, acetanilide, benzamide, dibenzamide, benzanilide, α-benzamidoisobutyric acid, ε-benzamidocaproic acid, benzoylaspartic acid, succinimide, phthalimide, glurarimide, 3,5,5-trimethyl-2,4-imidazolidinedione, 5,5-dimethyl-2,4-imidazolidinedione, 5,5-diethylbarbituric acid, barbituric acid, isocyanuric acid, phthalazone, melamine, naphthamide, hydroxybenzamide, saccharin, ε-caprolactam, β-propiolactam, γ-valerolactam, δ-valerolactam, heptolactam, 1-phenylurazol, 1-phenyl-2-methylurazol, quinazoline, methylquinazoline and octylamide.

28. The process of claim 3, wherein said compound comprising a —CONH— residue is present in an amount of from about 0.001 mol to about 2 moles per mol of the organic silver salt.

29. The process of claim 4, wherein said oxidizing agent is a peroxide represented by the following formulae:

$$M^{III}_2O_2$$

or $$M^{IV}O_2,$$

wherein $M^{III}$ represents Li, Na, K, $NH_4$, Rb, Cs, Ag or H, and $M^{IV}$ represents Mg, Ca, Sr, Ba, Zn, Cd or Hg.

30. The process of claim 4, wherein said oxidizing agent is a peroxide represented by the following formula:

$$R_{25}—O—O—R_{26},$$

wherein $R_{25}$ and $R_{26}$ each represents a hydrogen atom or a substituent containing 1-12 carbon atoms.

31. The process of claim 30, wherein said perioxide is ethylene peroxide or butyl peroxide.

32. The process of claim 4, wherein said oxidizing agent is a peroxide represented by the following formula:

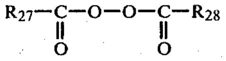

wherein $R_{27}$ and $R_{28}$ each represents a substituent having 1–22 carbon atoms.

33. The process of claim 32, wherein said substituent is an aryl group having 6–18 carbon atoms or an alkyl group having 1–8 carbon atoms.

34. The process of claim 4, wherein said oxidizing agent is a peroxide represented by the following formula:

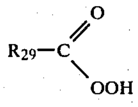

wherein $R_{29}$ represents a hydrogen atom or a substituent containing 1–24 carbon atoms.

35. The process of claim 34, wherein said substituent is an alkyl group having 1–12 carbon atom or an aryl group having 6–18 carbon atoms.

36. The process of claim 4, wherein said oxidizing agent is a peroxide selected from a peroxoacid and a peroxoacid salt.

37. The process of claim 36, wherein said peroxoacid is a peroxosulfuric acid.

38. The process of claim 36, wherein said peroxoacid salt is a peroxonitrate, a peroxocarbonate, a peroxosulfate or a peroxoborate.

39. The process of claim 36, wherein said peroxoacid salt is a peroxonitrate, a peroxocarbonate, a peroxosulfate or a peroxoborate.

40. The process of claim 1, wherein said composition containing an organic silver salt and a silver halide further contains a polymer 41. The process of claim 16, wherein said N-halogen compound is at least one compound represented by the following general formulae:

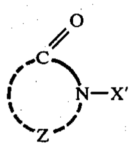

or

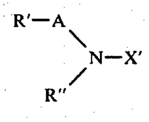

wherein X' is a halogen atom, Z represents an atomic group necessary for forming a 5-membered ring or 6-membered ring which can be condensed with another ring, which rings can contain an oxo group or a thiooxo group, and include rings where aromatic rings are combined with the above ring through a phenylene group, which rings can also be substituted with alkyl groups, aryl groups, alkoxy groups, halogen atoms, oxygen atoms and sulfur atoms, A represents a carbonyl group or a sulfonyl group, R' and R" each represents an alkyl group, an aryl group or an alkoxy group, and R" can also represent a hydrogen atom.

42. The process of claim 41, wherein said N-halogen compound is at least one compound selected from the group consisting of compounds (1) to (52) below:

(1) N-Bromosuccinimide
(2) N-Bromotetrafluorosuccinimide
(3) N-Bromophthalimide
(4) N-Bromoglutarimide
(5) 1-Bromo-3,4,4'-trimethyl-2,4-imidazolidinedione
(6) 1,3-Dibromo-5,5-dimethyl-2,4-imidazolidinedione
(7) N,N'-Dibromo-5,5-diethylbarbituric acid
(8) N,N'-Dibromobarbituric acid
(9) N-Bromoisocyanuric acid
(10) N-Bromoacetamide
(11) N-Bromochloroacetamide
(12) N-Bromotrifluoroacetamide
(13) N-Bromoacetanilide
(14) N-Bromobenzenesulfonylanilide
(15) N-Bromobenzamide
(16) N-Bromobenzenesulfonylamide
(17) N-Bromo-N-benzenesulfonylbenzenesulfonylamide
(18) N-Bromophthalazone
(19) N-Chlorosuccinimide
(20) N-Iodosuccinimide
(21) Trichloroisocyanuric acid
(22) N-Chlorophthalimide
(23) 1,3-Dichloro-5,5-dimethyl-2,4-imidazolidinedione
(24) 3-Chloro-5,5-dimethyl-2,4-imidazolidinedione
(25) 1,3-Diiodo-5,5-dimethyl-2,4-imidazolidinedione
(26) Trichloromelamine
(27) Tribromomelamine
(28) N-Bromocyclohexanedicarbonimide
(29) 1-Bromo-3,5,5-triethyl-2,4-imidazolidinedione
(30) 1-Bromo-3-ethyl-5,5-dimethyl-2,4-imidazolidinedione
(31) 1,3-Dibromo-5,5-diethyl-2,4-imidazolidinedione
(32) N,N-Dibromo-5,5-dimethylbarbituric acid
(33) N,N-Dibromo-5-ethyl-5-methylbarbituric acid
(34) N,N-Dibromo-5-ethyl-5-phenylbarbituric acid
(35) N,N'-Dibromoisocyanuric acid
(36) N-Bromoacetamide
(37) N-Bromonaphthamide
(38) N-Bromohydroxybenzamide
(39) N-Bromocarboxybenzamide
(40) N-Bromotoluenesulfonamide
(41) N-Bromo-N-toluenesulfonyltoluenesulfonylamide
(42) 1-Bromo-3,3,5-trimethyl-2,4-imidazolidinedithione
(43) 1-Bromo-3,5,5-triethyl-2,4-imidazolidinedithione
(44) 1-Bromo-3-ethyl-5,5-dimethyl-2,4-imidazolidinedithione
(45) 1,3-Dibromo-5,5-dimethyl-2,4-imidazolidinedithione
(46) 1,3-Dibromo-5,5-diethyl-2,4-imidazolidinedithione
(47) 1,3-Dichloro-5,5-dimethyl-2,4-imidazolidinedithione
(48) 3-Chloro-5,5-dimethyl-2,4-imidazolidinedithione
(49) 1,3-Diiodo-5,5-dimethyl-2,4-imidazolidinedithione
(50) N-Bromosaccharin
(51) N,N-Dibromo-5,5-dimethyl-2,4,6-pyrimidinetrione, and
(52) N,N-Dibromo-2,4,5-trioxypyrimidine 43. The process of claim 11, wherein said compound capable of forming a light-sensitive silver halide is used in an amount of from about 0.001 to about 0.5 mol per mol of the organic silver salt.

44. The process of claim 43, wherein said compound capable of forming a light-sensitive silver halide is used in an amount of from about 0.01 to about 0.3 mol per mol of the organic salt.

45. The process of claim 1, wherein $R_2$ is selected from the compounds represented by the following general formulae:

$R_4R_5N—$ $R_6R_7N—CS—NR_8—NR_9—$

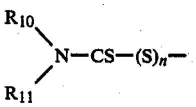

$R_{12}R_{13}C—N—NR_{14}—$, wherein $R_4$ to $R_{14}$ inclusive are the same as defined for $R_1$, and n represents an integer of 1 to 3.

46. The process of claim 1, wherein $R_2$ is represented by the formula MS—, wherein M represents a hydrogen atom or an alkali metal ion.

47. The process of claim 1, wherein said compound of general formula (31) is selected from the group consisting of:

$C_2H_5NHCSN(C_2H_5)_2$
$(CH_3)_2NCSNH_2$
$CH_3NHCSNH_2$
$CH_2=CHCH_2NHCSNH_2$
$C_6H_5NHCSNHC_6H_5$
$CH_3CONHCSNH_2$
$n—C_3H_7NHCSNH—n—C_3H_7$
$NH_2CSNHNHCSNH_2$
$(CH_3)_2NCS—S—S—CSNCH_3)_2$
$(C_2H_5)_2C=N—NHCSNHC_2H_5$
$CH_3NHCSSH$ and
$C_6H_5NHCS—SNa$.

48. The process of claim 1, wherein in the compound represented by the formula

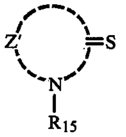

said substituent on said heterocyclic ring is an alkyl group, an alkylidene group, an aryl group or an arylidene group.

49. The process of claim 48, wherein said substituent is a methyl group, an ethyl group, a t-butyl group, a carboxymethyl group, a carboxyethyl group, an ethylidene group, a propylidene group, an isopropylidene group, a carboxyphenylethylidene group, a phenyl group, a tolyl group, a carboxyphenyl group, a benzylidene group, a tolylidene group, or a carboxybenzylidene group.

50. The process of calim 48, wherein said substituent is said alkylidene group or in arylidene group.

51. The process of claim 1, wherein said heterocyclic ring is an oxazolidine ring or an oxo or thioxo group containing hetero ring thereof.

52. The process of claim 1, wherein said heterocyclic ring is a thiazolidine ring or an oxo or thioxo group containing hetero ring thereof.

53. The process of claim 1, wherein said heterocyclic ring is an imidazolidine ring or an oxo or thioxo group containing hetero ring thereof.

54. The process of claim 1, wherein said heterocyclic ring is an isoxazolidine ring or an oxo or thioxo group containing hetero ring thereof.

55. The process of claim 1, wherein said heterocyclic ring is a pyrazolidine ring or an oxo or thioxo group containing hetero ring thereof.

56. The process of claim 1, wherein said heterocyclic ring is an isothiazolidine ring or an oxo or thioxo group containing hetero ring thereof.

57. The process of claim 1, wherein said heterocyclic ring is a tetrahydrotriazole ring or an oxo or thioxo group containing hetero ring thereof.

58. The process of claim 1, wherein said heterocyclic ring is a pyrimidine ring or an oxo or thioxo group containing hetero ring thereof.

59. The process of claim 1, wherein said heterocyclic ring is a quinazolidine ring or an oxo or thioxo group containing hetero ring thereof.

60. The process of claim 1, wherein said substitutent is an alkyl group.

61. The process of claim 1, wherein said sulfur-containing compound is selected from the group consisting of

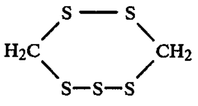 and 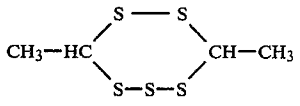

62. The process of claim 1, wherein the amount of the sulfur-containing compound is about $10^{-8}$ mol to about $10^{-2}$ mol per mole of the organic silver salt, heating is at 30° C. to 70° C. by the positive application of heat and heating is for 10 minutes to 180 minutes.

63. The process of claim 1, further comprising the additional subsequent step of preheating prior to imagewise exposure at about 80° C. to about 140° C.

64. The process of claim 1, wherein no reducing agent is present during said heating of said organic silver salt and said light-sensitive silver halide.

65. The process of claim 1, wherein said heating is at a temperature of 40° C. to 70° C.

66. The process of claim 65, wherein said heating is for a period of from 10 minutes to 60 minutes.

* * * * *